US012810131B2

(12) United States Patent
Akin et al.

(10) Patent No.: US 12,810,131 B2
(45) Date of Patent: Nov. 24, 2026

(54) HARDWARE ACCELERATOR OPTIMIZED GROUP CONVOLUTION BASED NEURAL NETWORK MODELS

(71) Applicant: Google LLC, Mountain View, CA (US)

(72) Inventors: Berkin Akin, Burlingame, CA (US); Suyog Gupta, Sunnyvale, CA (US); Cao Gao, Sunnyvale, CA (US); Ping Zhou, Santa Clara, CA (US); Gabriel Mintzer Bender, Mountain View, CA (US); Hanxiao Liu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 220 days.

(21) Appl. No.: 18/693,724

(22) PCT Filed: Oct. 8, 2021

(86) PCT No.: PCT/US2021/054148
§ 371 (c)(1),
(2) Date: Mar. 20, 2024

(87) PCT Pub. No.: WO2023/059335
PCT Pub. Date: Apr. 13, 2023

(65) Prior Publication Data

US 2024/0386260 A1 Nov. 21, 2024

(51) Int. Cl.
*G06N 3/063* (2023.01)
*G06N 3/0464* (2023.01)
(Continued)

(52) U.S. Cl.
CPC ........... *G06N 3/063* (2013.01); *G06N 3/0464* (2023.01); *G06V 10/7715* (2022.01); *G06V 10/82* (2022.01); *G06V 10/94* (2022.01)

(58) Field of Classification Search
CPC .. G06N 3/063; G06N 3/0464; G06V 10/7715; G06V 10/82; G06V 10/94; G06F 7/5443; G06F 17/153
See application file for complete search history.

(56) References Cited

U.S. PATENT DOCUMENTS

2019/0220977 A1 7/2019 Zhou et al.
2021/0019633 A1* 1/2021 Venkatesh ................. G06F 5/01
(Continued)

FOREIGN PATENT DOCUMENTS

CN 108090496 A 5/2018
CN 108875787 A 11/2018
(Continued)

OTHER PUBLICATIONS

Selvam, S. et al., 'FuSeConv: Fully Separable Convolutions for Fast Inference on Systolic Arrays', Feb. 2021 (Year: 2021).*
(Continued)

*Primary Examiner* — John B Strege
*Assistant Examiner* — Daniel C Chang
(74) *Attorney, Agent, or Firm* — Fish & Richardson P.C.

(57) ABSTRACT

Methods, systems, and apparatus, including computer-readable media, are described for processing an input image using integrated circuit that implements a convolutional neural network with a group convolution layer. The processing includes determining a mapping of partitions along a channel dimension of an input feature map to multiply accumulate cells (MACs) in a computational unit of the circuit and applying a group convolution to the input feature map. Applying the group convolution includes, for each partition: providing weights for the group convolution layer to a subset of MACs based on the mapping; providing, via an input bus of the circuit, an input of the feature map to each MAC in the subset; and computing, at each MAC in the
(Continued)

subset, a product using the input and a weight for the group convolution layer. An output feature map is generated for the group convolution layer based on an accumulation of products.

20 Claims, 9 Drawing Sheets

(51) Int. Cl.
*G06V 10/77* (2022.01)
*G06V 10/82* (2022.01)
*G06V 10/94* (2022.01)

(56) References Cited

U.S. PATENT DOCUMENTS

| | | | |
|---|---|---|---|
| 2021/0201132 A1 | 7/2021 | Han et al. | |
| 2021/0326697 A1 | 10/2021 | Huang et al. | |
| 2021/0397414 A1* | 12/2021 | Raha | G06F 7/5324 |
| 2023/0267313 A1* | 8/2023 | Kim | G06N 3/0464 706/27 |
| 2023/0306603 A1 | 9/2023 | Rhodes et al. | |
| 2023/0358901 A1 | 11/2023 | Labella et al. | |
| 2025/0124700 A1 | 4/2025 | Akin et al. | |

FOREIGN PATENT DOCUMENTS

| | | | |
|---|---|---|---|
| CN | 111553392 | A | 8/2020 |
| CN | 111784555 | A | 10/2020 |
| JP | 2020-123125 | A | 8/2020 |
| JP | 2020-177641 | A | 10/2020 |
| KR | 10-2020-0132305 | A | 11/2020 |
| TW | 202029074 | A | 8/2020 |
| WO | WO 2020/158384 | A1 | 8/2020 |
| WO | WO 2021/220422 | A1 | 11/2021 |
| WO | WO 2022/169521 | A | 8/2022 |

OTHER PUBLICATIONS

Zhuo Su et al., 'Dynamic Group Convolution for Accelerating Convolutional Neural Networks', arXiv:2007.04242v2 [cs.CV] Jul. 10, 2020 (Year: 2020).*
Office Action in Japanese Appln. No. 2024-520986, mailed on Jun. 17, 2025, 8 pages (with English translation).
Office Action in Japanese Appln. No. 2024-520990, mailed on Jun. 10, 2025, 8 pages (with English translation).
Tan et al., "EfficientNetV2: Smaller Models and Faster Training," CoRR, Submitted on Jun. 23, 2021, arXiv:2104.00298v3, 11 pages.
Office Action in Indian Appln. No. 202447031101, mailed on Jul. 3, 2025, 9 pages.
Huang et al., "CondenseNet: An Efficient DenseNet Using Learned Group Convolutions," Paper, Presented at the Conference on Computer Vision and Pattern Recognition, Salt Lake City, UT, Jun. 18-23, 2018; Proceedings of the Conference on Computer Vision and Pattern Recognition, Feb. 2019, pp. 2752-2761.
International Preliminary Report on Patentability in International Appln. No. PCT/US2021/054148, mailed on Apr. 18, 2024, 8 pages.
International Search Report and Written Opinion in International Appln. No. PCT/US2021/054148, mailed on Jul. 13, 2022, 14 pages.
Sanchez et al., "AWARE-CNN: Automated Workflow for Application-aware Real-time Edge Acceleration of CNNs," IEEE Internet of Things Journal, Apr. 2020, 7(10):1-12.
Selvam et al., "FuSeConv: Fully Separable Convolutions for Fast Inference on Systolic Arrays," Paper, Presented at the Design, Automation & Test in Europe Conference & Exhibition, Grenoble, France, Feb. 1-5, 2021; Proceedings of the Design, Automation & Test in Europe Conference & Exhibition, Sep. 2021, pp. 651-656.
Gupta et al., "Accelerator-aware Neural Network Design using AutoML," CoRR, Submitted on Mar. 5, 2020, arXiv:2003.02838v1, 5 pages.
International Preliminary Report on Patentability in International Appln. No. PCT/US2021/054160, mailed on Apr. 18, 2024, 8 pages.
International Search Report and Written Opinion in International Appln. No. PCT/US2021/054160, mailed on Jul. 11, 2022, 13 pages.
Lu et al., "MUXConv: Information Multiplexing in Convolutional Neural Networks," CoRR, Submitted on Mar. 31, 2020, arXiv:2003.13880v1, pp. 1-15.
Office Action in Korean Appln. No. 10-2024-7011391, mailed on Mar. 6, 2025, 16 pages (with English translation).
Research.google [online], "Introducing the Next Generation of On-Device Vision Models: MobileNetV3 and MobileNetEdgeTPU," Nov. 13, 2019, retrieved on Mar. 25, 2025, retrieved from URL<https://research.google/blog/introducing-the-next-generation-of-on-device-vision-models-mobilenetv3-and-mobilenetedgetpu/>, 8 pages.
Wu et al., "FBNet: Hardware-Aware Efficient ConvNet Design via Differentiable Neural Architecture Search," Paper, Presented at Proceedings of the IEEE/CVF Conference: Computer Vision and Pattern Recognition, Long Beach, CA, Jun. 15-20, 2019, pp. 10734-10742.
Xie et al., "Aggregated Residual Transformations for Deep Neural Networks," CoRR, Submitted on Apr. 11, 2017, arXiv:1611.05431v2, pp. 1-10.
Xiong et al., "MobileDets: Searching for Object Detection Architectures for Mobile Accelerators," CoRR, Submitted on Mar. 31, 2021, arXiv:2004.14525v3, pp. 1-11.
Zagoruyko et al., "Wide Residual Networks," CoRR, Submitted on Jun. 14, 2017, arXiv:1605.07146v4, 15 pages.
Zhang et al., "ShuffleNet: An Extremely Efficient Convolutional Neural Network for Mobile Devices," CoRR, Submitted on Dec. 7, 2017, arXiv:1707.01083v2, pp. 1-9.
Zhang et al., "VarGNet: Variable Group Convolutional Neural Network for Efficient Embedded Computing," CoRR, Submitted on Jul. 12, 2019, arXiv:1907.05653v1, pp. 1-15.
Zhou et al., "Rethinking Bottleneck Structure for Efficient Mobile Network Design," CoRR, Submitted on Nov. 27, 2020, arXiv:2007.02269v4, 24 pages.
Lu et al., "MUXConv: Information Multiplexing in Convolutional Neural Networks," Paper, Presented at Proceedings of the IEEE/CVF Conference: Computer Vision and Pattern Recognition, Virtual Event, Jun. 13-19, 2020, pp. 12044-12053.
Notice of Allowance in Japanese Appln. No. 2024-520986, mailed on Oct. 14, 2025, 5 pages (with English translation).
Notice of Allowance in Taiwanese Appln. No. 111118621, mailed on Feb. 2, 2026, 16 pages (with English translation).
Office Action in Japanese Appln. No. 2024-520990, mailed on Oct. 21, 2025, 8 pages (with English translation).
Office Action in Korean Appln. No. 10-2024-7011391, mailed on Dec. 2, 2025, 16 pages (with English translation).
Office Action in Taiwanese Appln. No. 111118802, mailed on Nov. 7, 2025, 16 pages (with English translation).
Office Action in European Appln. No. 21801780.4, mailed on Jun. 19, 2026, 7 pages.
Office Action in Indian Appln. No. 202447028629, mailed on Apr. 28, 2026, 4 pages.
Office Action in Indian Appln. No. 202447028629, mailed on Jun. 1, 2026, 4 pages.

* cited by examiner

HARDWARE ACCELERATOR OPTIMIZED GROUP CONVOLUTION BASED NEURAL NETWORK MODELS

CROSS-REFERENCE TO RELATED APPLICATIONS

This application is a U.S. National Stage application under 35 U.S.C. § 371 and claims the benefit of priority to International Application No. PCT/US2021/054148, having an International Filing date of 8 Oct. 2021, the contents of which are hereby incorporated by reference.

BACKGROUND

This specification generally relates to using hardware integrated circuits to perform group convolutions for a convolutional neural network.

Neural networks are machine-learning models that employ one or more layers of nodes to generate an output, e.g., a classification, for a received input. Some neural networks include one or more hidden layers in addition to an output layer. Some neural networks can be convolutional neural networks configured for image processing or recurrent neural networks (RNNs) configured for speech and language processing. Different types of neural network architectures can be used to perform a variety of tasks related to classification or pattern recognition, predictions that involve data modeling, and information clustering.

A neural network layer can have a corresponding set of parameters or weights. The weights are used to process inputs (e.g., a batch of inputs) through the neural network layer to generate a corresponding output of the layer for computing a neural network inference. A batch of inputs and set of kernels can be represented as a tensor, i.e., a multi-dimensional array, of inputs and weights. A hardware accelerator is a special-purpose integrated circuit for implementing neural networks. The circuit includes memory with locations corresponding to elements of a tensor that may be traversed or accessed using control logic of the circuit.

SUMMARY

This specification describes techniques for efficiently implementing group convolutions on a hardware neural network accelerator. Group convolutions convolve their input feature maps by grouping them along a channel dimension of an input matrix where each input group representing a group convolution is associated with a corresponding output group. In particular, based on these techniques group convolutions can be leveraged to realize certain hardware and computing efficiencies when processing an input image using a convolutional neural network (CNN) of a machine-learning model implemented on an example computing device such as a tablet or smartphone.

An input image is processed using a hardware integrated circuit that implements a convolutional neural network with a group convolution layer. The processing includes determining a mapping of partitions along a channel dimension of an input feature map to multiply accumulate cells in a computational unit of the integrated circuit and applying a group convolution to the input feature map. Applying the group convolution includes, for each partition: providing weights for the group convolution layer to a subset of MACs based on the mapping; providing, via an input bus of the circuit, an input of the feature map to each MAC in the subset; and computing, at each MAC in the subset, a product using the input and a corresponding weight for the group convolution layer. An output feature map is generated for the group convolution layer based on an accumulation of products.

One aspect of the subject matter described in this specification can be embodied in a method for processing an input image using a hardware integrated circuit configured to implement a convolutional neural network that includes multiple neural network layers. The neural network layers includes a group convolution layer. The method includes identifying a control parameter that defines multiple partitions along a channel dimension of an input feature map; determining a mapping of the partitions to multiply accumulate cells (MACs) in a computational unit of the integrated circuit; and applying, for the group convolution layer, a group convolution to the input feature map.

The applying includes, for each of the partitions: providing, based on the determined mapping, weights for the group convolution layer to a subset of the plurality of MACs; providing, via an input bus of the integrated circuit, a respective input of the input feature map to each MAC in the subset; and computing, at each MAC in the subset, a product using the respective input and a corresponding weight for the group convolution layer. The method includes generating an output feature map for the group convolution layer based on an accumulation of products.

These and other implementations can each optionally include one or more of the following features. For example, in some implementations, determining a mapping of the partitions to the multiply accumulate cells includes: determining the mapping based on a number of channels in each of the partitions. In some implementations, each partition of the multiple partitions includes a respective quantity of input channels that correspond to a respective size of the partition.

Generating the output feature map includes: generating the output feature map based on the respective size of each partition. In some implementations, generating the output feature map includes: computing multiple products using the subset of the MACs; and generating the accumulation of products from the multiple products. The method can include: accessing information describing a hardware configuration of the computational unit; and determining the respective size of each partition based on the hardware configuration of the computational unit.

In some implementations, the input bus includes a broadcast function and the method further includes: broadcasting, via the input bus and for each partition, multiple inputs of the input feature map to the computational unit of the integrated circuit. The method can also include broadcasting, via the input bus and for a first partition of the input feature map, first inputs of the first partition to each MAC in the subset; wherein the first inputs that are broadcast are reused during computations for the group convolution layer. In some implementations, the first partition of the input feature map corresponds to a first partition of the output feature map; and the first inputs have reuse over outputs of the first partition of the output feature map.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation causes the system to perform the actions. One or more computer programs can be so configured by virtue of having instructions that, when executed by a data processing apparatus, cause the apparatus to perform the actions.

The subject matter described in this specification can be implemented in particular embodiments so as to realize one or more of the following advantages. Techniques are described for leveraging an example hardware architecture of a special-purpose integrated circuit to realize improvements in the execution of convolutional neural networks that include group convolution layers, i.e., layers that perform group convolutions as opposed to depthwise convolutions or full convolutions.

The hardware architecture includes a particular type of memory layout, a broadcast input bus, and a configuration of multiply accumulate cells that can implement group convolutions with improved compute efficiency and hardware utilization relative to conventional architectures. The input bus is coupled to the multiply accumulate cells and is configured to broadcast inputs across some (or all) of the multiply accumulate cells. The broadcast function allows for parallelizing computations for inputs that are reused when computing an output channel for a corresponding group convolution.

The architecture can be used to optimize execution of various types of group convolution based neural networks and allows for applying a wider range of group convolution concepts to various computer vision tasks. For example, a compiler or related control logic can be used to determine optimal mappings of group convolution operations to multiply accumulate cells in a computational unit of the circuit.

The mappings may be determined to optimize different aspects of a compute operation, such as to maximize overall utilization of the computational unit, minimize overall latency of the operation, or both. An advantage of a particular mapping can be to minimize an amount of off-chip communication that is required to fetch new or additional parameters for a given compute. An example device (e.g., a host) that determines the mappings may be off-chip relative to the integrated circuit. In some implementations, the compiler as well as other related control logic may be embodied in the example device.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
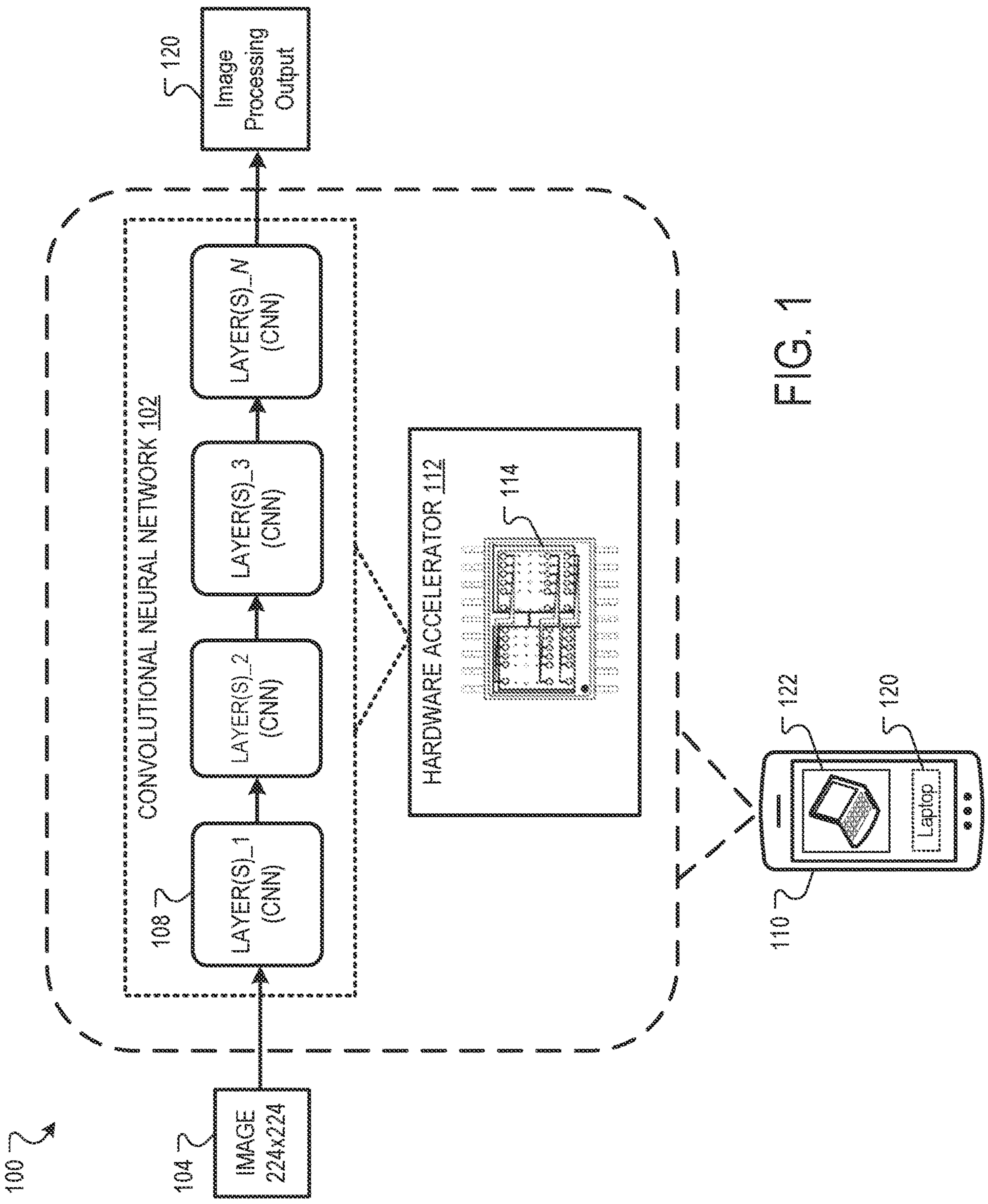
FIG. 1 is a block diagram of an example computing system for performing group convolutions on an image.

FIG. 1 is a block diagram of an example computing system 100 for performing group convolutions on an input image. The system 100 generally includes an example convolutional neural network 102 that is configured to process an image 104, i.e., to process the intensity values of the pixels of the image. The convolutional neural network 102 includes an example neural network architecture that is based on multiple convolutional neural network layers 108. In the example of FIG. 1, the convolutional neural network 102 includes multiple convolutional neural network layers 108. For example, the convolutional neural network 102 includes N number (or sets) of layers, where N is an integer greater than one.

Different types of CNN architectures 106 can be used to perform a variety of machine-learning tasks. For example, the machine learning task can be a computer vision task (also referred to as an "image processing task"). In other words, the neural network can be configured to receive an input image and to process the input image to generate a network output for the input image, i.e., to perform some kind of image processing task. In this specification, processing an input image refers to processing the intensity values of the pixels of the image using a neural network. For example, the task may be image classification and the output generated by the neural network for a given image may be scores for each of a set of object categories, with each score representing an estimated likelihood that the image contains an image of an object belonging to the category.

As another example, the task can be image embedding generation and the output generated by the neural network can be a numeric embedding of the input image. As yet another example, the task can be object detection and the output generated by the neural network can identify locations in the input image, e.g., bounding boxes or other geometric regions within the image, at which particular types of objects are depicted. As yet another example, the task can be image segmentation and the output generated by the neural network can define, for each pixel of the input image, which of multiple categories the pixel belongs to. More generally, however, the task can be any of a variety of tasks, including tasks that process inputs other than images.

Some image processing tasks may be related to object detection, data classification, pattern recognition, or image recognition, as well as computational predictions that involve data modeling, and information clustering. For example, a task can involve object detection, where the CNN processes an image to detect a particular object and generates an output identifying the object upon detection of the object. Another task can involve data/image classification, where the CNN processes an image to determine a classification for the image and generates a particular classification output for the image based on the content of the image. Another task can involve pattern recognition, where the CNN processes an image to identify or recognize a particular pattern in the image and generates an output indicating the recognized pattern based on the content of the image. Another task can involve general image recognition, where the CNN processes an image to identify or recognize various elements of the image and generates an output indicating the recognized elements based on content of the image.

In some implementations, the convolutional neural network 102 is implemented at, or accessible by, an example mobile device 110. The mobile device 110 can be a smartphone, tablet, e-notebook, laptop, gaming console, or related portable computing device. In some other implementations, the convolutional neural network 102 is integrated in, or accessible by, an example cloud-based system, such as a server bank, groups of servers, or a multi-processor system.

The convolutional neural network 102 can be implemented using one or more machine-learning hardware accelerators 112. Each hardware accelerator 112 corresponds to one or more special-purpose hardware integrated circuits 114. In general, circuit 114 is a hardware circuit (e.g., special-purpose hardware circuit) that performs neural network computations. For example, some (or all) of the circuits 114 may be special-purpose hardware circuits, such as an application-specific integrated circuit (ASIC), field-programmable gate array (FPGA), a single-core neural network processor, or a multi-core neural network processor. The circuits 114 may also be a special-purpose graphics processing unit (GPU).

The hardware circuit 114 is operable to accelerate computations for a neural network workload. In some implementations, the hardware circuit 114 includes control logic, which may be implemented in hardware, software, or both. The control logic is used to issue instructions for a neural network computation, including obtaining and routing data used for the computations. The circuit 114 can include memory for storing inputs, input activations, outputs, output activations, and parameters for each of the layers of the neural network. In some implementations, the circuit 114 includes dedicated memory, shared memory, or both. For example, the circuit 114 can include an input/activation memory for storing the inputs, input activations, outputs, or output activations, and a parameter memory for storing a respective set of parameters for each of the neural network layers.

The circuit 114 can include a computation unit, such as a hardware matrix unit, an arrangement of compute tiles, or a combination of these. The computation unit is used to perform the neural network computations for processing an input through a layer of the neural network. In some implementations, each of the matrix unit or individual compute tiles include one or more arrays of compute cells, such as multiply accumulate cells that perform multiplication and accumulation operations. For example, each cell can perform a multiplication of an input and a weight value to generate a product, and perform an accumulation (e.g., addition operations) of products over multiple clock cycles.

The circuit 114 implements full, depthwise, and group convolutions to convolve different filters of weights against corresponding portions of the input matrix for a given depth of a channel dimension of the input matrix. For example, the mobile device 110 uses the convolutional neural network 102, and the model's CNN layers 108, to generate an image processing output 120, e.g., a recognition or detection output, for a received input 104. For example, the input 104 may be an image of a laptop 122 and the mobile device 110 uses the convolutional neural network 102 to process the image and detect or recognize that the image includes a depiction of a laptop.

Figure 2:
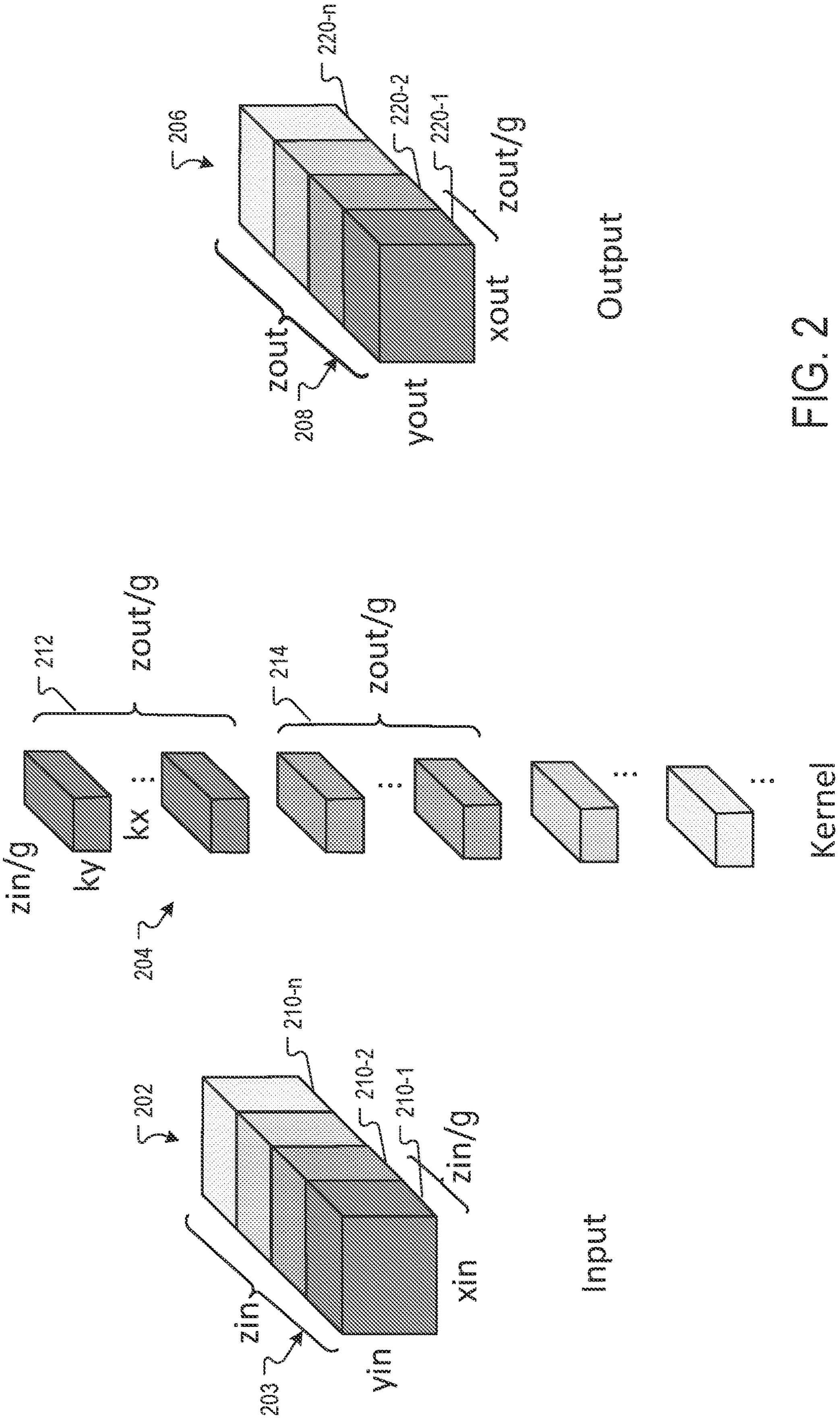
FIG. 2 is a block diagram showing example groupings used for group convolutions.

FIG. 2 is a block diagram that includes a representation of an input dataset 202 and example groupings 203 for performing group convolutions using inputs from the input dataset. In some implementations, the input dataset 202 is, or is derived from, a multi-dimensional matrix structure of inputs. For example, the matrix structure can be input tensor that includes Zin channels, each of which have spatial dimensions X by Y. The matrix structure (or tensor) can represent either a set of inputs, a set of activation inputs, or a set of weight inputs. In some cases, a matrix structure for a set of activation inputs is referred to in this specification as an input feature map, and a matrix structure for a set of weight inputs is referred to as a kernel matrix structure.

In the example of FIG. 2, the input dataset 202 is a matrix structure that has three dimensions: two (X,Y) spatial dimensions and one (Z) channel dimension. Regarding the spatial dimensions, in some implementations, these dimensions correspond to a space or position of a set of activation inputs. For example, if the convolutional neural network 102 is processing an image 104, which has two dimensions, the matrix structures can have two spatial dimensions, which correspond to spatial coordinates, i.e., X,Y coordinates, of the image. Regarding the channel dimension, this dimension corresponds to features from an input (e.g., an activation input). The channel dimension is described with reference to the Z, Zin, or channel dimension, where "channel" can correspond to a color channel of an image.

The system 100 is configured to determine a partitioning of group convolutions, for example, with reference to a depth level of the channel dimension of input dataset 202. Each input channel can have corresponding depth levels. For example, the matrix structure of FIG. 2 has depth levels that extend along the Zin dimension. By way of illustration, if an example matrix structure 202 represents a 3×3×3 image sent as a set of activation inputs to a convolutional neural network layer, the X and Y dimensions of the image (3×3) can be the spatial dimensions, and the Z dimension (3) can be the channel dimension corresponding to R, G, and B values.

As noted above, the system 100 can determine a partitioning of group convolutions along the channel dimension of an example input feature map. For example, the system 100 can determine a first partitioning for input group 210-1 along the channel dimension and a second partitioning for input group 210-2 along the channel dimension. In some implementations, the system 100 determines n number of groupings **210-*n* along the channel dimension, where n is an integer greater than or equal to 1. In the example where the input feature map 202 represents a 3×3×3 image sent as a set of activation inputs, the first partitioning to define input group 210-1 for a group convolution can correspond to a feature of nine '1' activation inputs, e.g., red values, the second partitioning to define input group 210-2 for a group convolution can correspond to a feature of nine '2' activation inputs, e.g., green values, and a third partitioning to define input group 210-3** for a group convolution can correspond to a feature of nine '3' activation inputs, e.g., blue values.

As discussed above, group convolutions convolve their input feature maps by grouping them along a channel dimension of an input matrix, where each input group **210-*n* representing a group convolution is associated with a corresponding output group 220-*n*. The convolutional neural network 102 employs one or more convolutional neural network layers 108 to generate an output 206, e.g., a classification, for a received input 202. For example, each convolutional neural network layer has an associated set of kernels 204. The kernels 204 may be partitioned in accordance with the configuration of group convolutions, such that each input group 210**-*n* is convolved with a corresponding kernel/weight matrix to generate a convolved output 220-*n*. In the example of FIG. 2, input group 210-1 is convolved with corresponding kernel matrix 212 to generate convolved output 220-1, whereas input group 210-2 is convolved with corresponding kernel matrix 214 to generate convolved output 220-2.

The system 100 is configured to dynamically determine a value for the control parameter g, where g is an integer greater than 1. The system 100 is also configured to determine a group size by computing Zin/g, where Zin is the number of input channels along a channel dimension of an input tensor and g is the number of groups as defined by the control parameter. The control parameter g is used to define a number of group convolutions (e.g., the partitioning). In some instances, the value for g may be determined dynamically at system 100 or predefined at system 100 for a given operation. For example, the control parameter g that defines a number of group convolutions can be predefined (and/or embedded) by a compiler of system 100 or dynamically determined at runtime.

In some implementations, the system 100 defines a number of group convolutions (e.g., the partitioning) based on a particular type of machine-learning task that is requested and sets the value for the control parameter g accordingly for that task. In some other implementations, the system 100 defines a number of group convolutions (e.g., the partitioning) based on: i) a type of machine-learning task to be processed; ii) the neural architecture of the convolutional neural network; iii) the compute environment; iv) performance objectives; or v) a combination of theses. Example compute environments can include cloud-based computing environments or mobile device computing environments. The performance objectives can include speed, latency, hardware utilization, model accuracy, parameter size, or a combination of these.

The group convolutions can be described as a generalized form of a convolution. In some implementations, the system 100 initializes a control parameter g by assigning a particular value to the control parameter. The initialized or assigned value of the control parameter g can be used to control the partitioning of the group convolutions. For example, if system 100 determines a convolution operation that uses data for the entire channel dimension is required (e.g., a full convolution), then the system 100 sets the value of the control parameter as g=1 and triggers and/or executes a full convolution using the relevant data of the matrix structure 202.

Relatedly, the system 100 may determine a grouping of depthwise separable convolutions are required for a given step in a larger neural network computation. For example, if system 100 determines two or more depthwise separable convolutions that use data for a portion of the channel dimension is required, then the system 100 sets the control parameter to a desired value (e.g., g=4) and triggers and/or executes the two or more (e.g., four) depthwise separable convolutions using the relevant portions of data in the matrix structure 202. In some implementations, computations for two or more group convolutions are performed sequentially, concurrently, or a combination of these. For example, some (or all) of the respective sets of computations for each of the two or more depthwise separable convolutions may be performed sequentially or in parallel.

As noted above, the group/ed convolution techniques described in this document provide a more fine grained control over at least the utilization metrics and computational efficiency of hardware resources of an example ML accelerator. In some implementations, these group convolution techniques provide versatile blocks or control knobs that are used to influence and control certain attributes or performance metrics of an example machine-learning model. For example, selection of a value of the control parameter g that is between 1 and the number of channels (z) provides a continuum between the two example constraints of a full convolution and a depthwise separable convolution. This is explained in more detail below.

Figure 3:
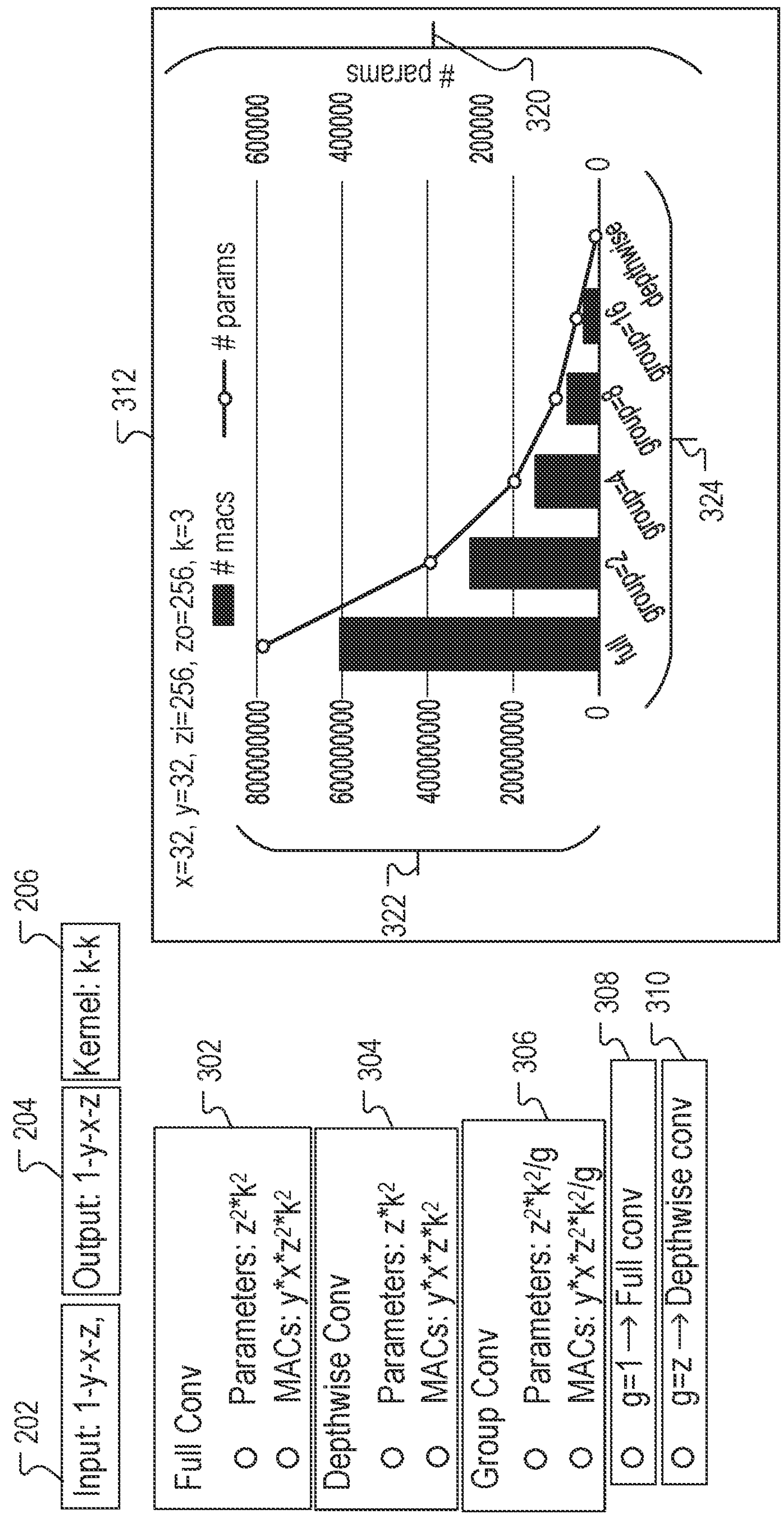
FIG. 3 shows example attributes of a machine-learning model with regard to different convolution operations.

FIG. 3 shows example attributes of a machine-learning model. In general, the attributes correspond to different convolution operations performed using the convolutional neural network 102 described above. For example, attributes 302 show parameter quantities and multiply accumulate cells (MACs) that are used to perform operations for a full convolution, attributes 304 show parameter quantities and multiply accumulate cells that are used to perform operations for a depthwise convolution, and attributes 306 show parameter quantities and multiply accumulate cells that are used to perform operations for a group convolution.

The control parameter g and configuration of group convolutions can be determined and/or tuned to control a number of parameters (e.g., trainable parameters) used for a given task as well as a quantity of multiply accumulate cells used to perform operations for the task. Each of these example attributes 302, 304, 306 of the machine-learning model can have a corresponding affect or influence on different performance metrics of the model. For example, an increase or decrease in the quantity of trainable parameters, and/or the quantity of multiply accumulate cells (or operations), will have a corresponding effect on the accuracy, speed, and/or latency of the machine-learning model. In another example, relative to full convolution, use of depthwise convolutions can be a light-weight and low-cost (i.e., less resource intensive) option, but executing depthwise convolutions at integrated circuits of an ML accelerator often results in poor utilization of hardware resources of the circuit.

For example, when performing a depthwise (or depthwise separable) convolution, a standard hardware array of circuit 114 that includes tens or hundreds of hardware multiply accumulate cells can experience 3% utilization of those hardware cells for a given compute cycle, while experiencing minimal or low latency. Hence, use of depthwise convolutions may be speedy, but it is also inefficient due to its low hardware utilization. Conversely, when performing a full convolution the hardware array of circuit 114 can experience substantially higher utilization (e.g., 73%), such that a majority of the array's multiply accumulate cells are used for a given compute cycle. When compared to depthwise convolution, this higher utilization when performing full convolutions often comes at the expense of substantially higher compute latency.

As described above, the group convolution techniques described in this document provide a more fine grained control over the utilization metrics and computational efficiency of hardware resources of an example ML hardware accelerator. The selection of a value of the control parameter g that is between 1 and the number of channels (z) provides a continuum between the two example constraints of a full convolution (308) and a depthwise separable convolution (310). The system 100 can determine a partitioning of group convolutions with reference to a depth level of the channel dimension, as shown in the example of FIG. 2. The control parameter g is used to define a number of group convolutions (e.g., the partitioning).

The example graph 312 of FIG. 3 shows example parameter quantities 320 and MACs quantities 322 for a selection of different values (324) for g that are between 2 and the number of channels (z) along the continuum between a full convolution (308) and a depthwise convolution (310). In this example the zin dimension is 256. Graph 312 shows examples of the decrease in the quantity of trainable parameters and the quantity of multiply accumulate cells (or operations) relative to a corresponding increase in the value (g) of a group convolution.

As discussed above, the circuit 114 can include memory with locations corresponding to elements of a tensor that may be traversed or accessed using control logic of the circuit to compute an output of a layer, such as a group convolution layer. Elements (e.g., inputs or activations) fetched from memory must be useful for computing multiple outputs of the layer. The number of weights (i.e., parameters) can also scale with a size of a grouping. In some implementations, a transfer of parameters from memory can become a bottleneck that increases latency of a compute. When determining a preferred neural network architecture, an example set of search data or simulations can indicate a bottleneck with respect to parameter transfer time. An architecture can then be defined that uses the disclosed group convolution concepts and group convolution based neural blocks to reduce a number of parameters and improve or accelerate compute time for a machine-learning task.

Figure 4:
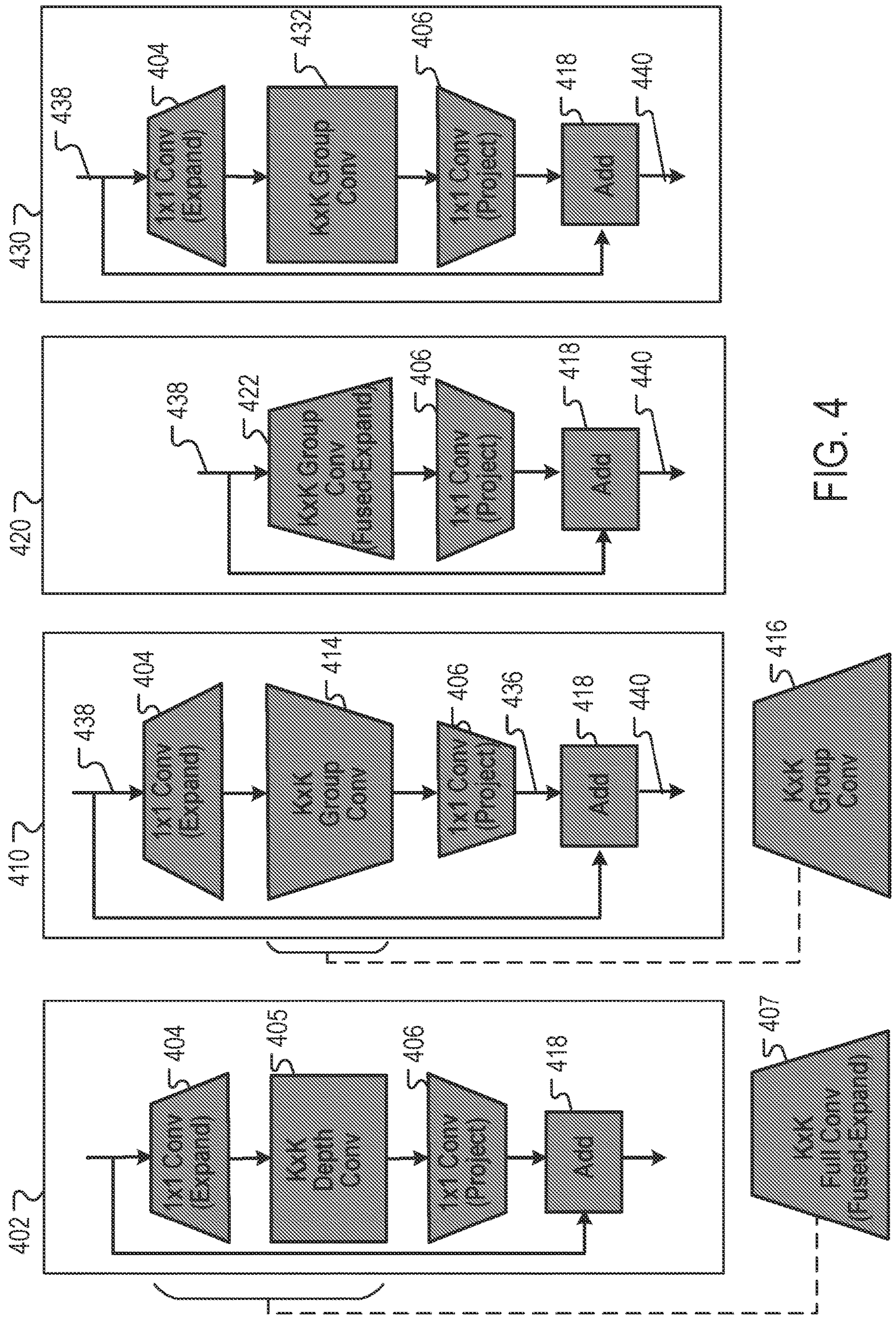
FIG. 4 is a block diagram showing operations corresponding to different layer blocks of a convolutional neural network.

FIG. 4 is a block diagram showing examples of a process block 410, process block 420, and process block 430. Each of the process blocks 410, 420, 430 includes one or more layer blocks. In general, each of the process blocks 410, 420, 430 can be represented by different layer blocks of a convolutional neural network. In the example of FIG. 4, each of the process blocks 410, 420, and 430 can be a subset of operations that are performed for a given convolution operation. The convolution operation is executed using the convolutional neural network 102, which may be implemented on the example hardware integrated circuit 114 described above.

A neural network block can describe a single layer or a component of the neural network that includes multiple layers. A common block that is extensively used in example computer vision models, such as a mobile vision model, is an inverted bottleneck (IBN) layer block 402 ("IBN layer 402"). In general, an IBN block can be a macro block of a larger neural architecture that combines a number of convolution layers in a certain way. Multiple types of layers (or blocks), including IBN layers, are used as building blocks to form an example classification or object detection network.

An IBN layer 402 can include a pointwise convolution (404), a K×K depthwise convolution (405), and a final pointwise convolution (406). A pointwise convolution expands the channel dimension and an example of this pointwise convolution is shown at FIG. 4 as a "1×1 Conv (Expand)." The K×K depthwise convolution kernel is applied at the expanded depth of the channel dimension following the pointwise convolution. The final pointwise convolution (406) projects the expanded channel dimension back to a smaller value. An example of this final pointwise convolution is shown at FIG. 4 as a "1×1 Conv (Project)."

The use of the K×K depthwise convolutions, such as in the IBN layer block 402, is quite common. This is because, after expansion, computing full convolutions over a large or expanded channel dimension is very costly in terms of processing and computational resources. In some implementations, the pointwise convolution (404) and the K×K depthwise convolution (405) are replaced with a K×K full convolution (fused-expand) process block, which represents a fused-IBN layer 407. In general, the fused-IBN layer 407 merges expansion and depthwise convolution operations into a single full convolution neural block.

Full convolutions can involve a large number of parameters/weights and require a substantial percentage of hardware computing resources of an integrated circuit. As indicated above, examples of such resources can be multiply accumulate cells of a hardware computational array (e.g., a systolic array) of circuit 114, a vector unit of integrated circuit 114, or both. In contrast, the disclosed group convolution techniques implemented using the disclosed neural block alternatives, such as blocks 414, 416, 422, 432 described below, provide an improved approach to increasing a quantity of trainable parameters for a set of input channels (e.g., large input channles), thereby improving model accuracy, but at a lower computational cost relative to non-group convolution alternatives.

Referring now to process block 410, a grouped IBN progressive projection (or progressive expansion) block is shown where the K×K depthwise convolution (405) described above is replaced with a K×K group convolution (414) or (416). Process block 410 can have a first example that implements a K×K group convolution (414) to perform progressive projection of the channel dimension or a second example that implements a K×K group convolution (416) to perform progressive expansion of the channel dimension.

In the first example of process block 410, the system 100 can generate an expanded feature map from an input feature map (e.g., an input 438) by applying a 1×1 convolution (expand) (404) to the input feature map. The input feature map can be an h×w feature map with c1 channels. This expanded feature map can be an h×w feature map with c2 channels, where c2 is greater than c1. In some implementations, the 1×1 convolution has a larger number of output filters than input filters. The K×K group convolution (414) is applied to the expanded feature map to perform progressive projection of the channel dimension. For example, the convolutional neural network 102 can perform progressive projection on the expanded feature map using a group convolution implemented at a group convolution layer of the convolutional neural network 102. The grouped-IBN progressive projection can provide flexibility to tradeoff parameters dedicated to the projection and the main K×K convolution operators.

In this first example of process block 410, a final pointwise convolution (406) projects the expanded channel dimension back to a smaller value. Hence, a K×K kernel associated with the group convolution can perform an initial reduction in the channel size, before the 1×1 projection (406) lowers the channel size to a final value. Each of the add blocks 418 is an optional residual (or skip) connection that can be used to add an example convolved output 436 with an input 438 that is fed to a given process block (e.g., 410). The example sum 440 is passed as an output of operations performed at a corresponding process block.

In the second example of process block 410, the system 100 can generate an initial expanded feature map from an input feature map (e.g., an input 438) by applying a 1×1 convolution (expand) (404) to the input feature map. This initial expanded feature map can be an h×w feature map with c2 channels, where c2 is greater than c1. The system 100 generates an expanded feature map from the initial expanded feature map by applying a K×K group convolution (416) to the initial expanded feature map. For example, the convolutional neural network 102 can generate the expanded feature map from the initial expanded feature map using a group convolution implemented at a group convolution layer of the convolutional neural network 102. The expanded feature map can be an h×w feature map with c3 channels, where c3 is greater than c2. This grouped-IBN progressive expansion operation can provide flexibility to trade-off parameters dedicated to the expansion and the main K×K convolution operators. The grouped-IBN progressive expansion can keep part of the expansion layer un-fused and allow channel-wise convolution across groups before the main K×K convolution. A final pointwise convolution (406) of process block 410 projects the expanded channel dimension back to a smaller value.

Referring now to process block 420, this process block is a fused-grouped IBN block where the 1×1 convolution (expand) (404) and the K×K depthwise convolution (405) described above are replaced with a K×K group convolution (422). This K×K group convolution (422) includes a "fused-expand" designation at least because it allows for replacing a pointwise (404)+depthwise (405) pair and fusing aspects of those operations via the K×K group convolution (422) to expand the channel dimension. Thus, at process block 420, the system 100 can generate an expanded feature map from an example input feature map (e.g., an input 438) by applying the K×K group convolution (422) to the input feature map. The example input feature map can be an h×w feature map with c1 channels. The expanded feature map can be an h×w feature map with c2 channels, where c2 is greater than c1. A final pointwise convolution (406) of process block 420 projects the expanded channel dimension back to a smaller value. As noted above, a corresponding sum 440 is passed as an output of the particular operations performed at process block 420.

In some implementations, the fused-group convolution block 422 provides an alternative to the fused-IBN layer 407 that allows for more efficient processing along the channel dimensions. For example, these efficiencies may be realized at later stages of a computer vision model. In some cases, these later stages correspond to when the data resolution associated with convolutions along the channel dimension are quite large. The increase in processing speed afforded by the fused-group convolution may be particularly optimized when the process block 420, including its group convolution operations, is executed using a particular type of special-purpose integrated circuit. For example, the special-purpose integrated circuit may be a neural network processor that includes a broadcast input bus that broadcasts layer inputs from the memory to one or more compute cells of the circuit as described below with reference to FIG. 6.

The fused-group convolution block 422 can require a slightly higher parameter count relative to the grouped IBN layer 414. On the continuum between the two constraints of a full convolution and a depthwise separable convolution, the fused-group IBN 422 is higher on the continuum. For example, the fused-grouped IBN layer 422 may be closer to a full convolution along the continuum from depthwise convolution to full continuum.

Referring now to process block 430, this process block is a grouped IBN block where the K×K depthwise convolution (405) described above is replaced with a K×K group convolution (432). As described above, the system 100 applies a 1×1 convolution (404) to an input 438 to generate an expanded feature map. The K×K group convolution (432) is applied at a group convolution layer of the convolutional neural network 102. The K×K group convolution (432) can have the same total number of input filters and output filters. Similar to other process blocks, a final pointwise convolution (406) of process block 430 projects the expanded channel dimension back to a smaller value and a corresponding sum 440 is passed as an output of the particular operations performed at process block 430.

The convolution operations executed at process block 430 can involve smaller expansion ratios relative to a baseline IBN layer. These smaller expansion ratios can lead to reduced parameter counts. To recover the parameter counts, convolution operations of process block 430 (as well as other process blocks) can use a group convolution for the K×K kernel which leverages cross-channel information. The K×K group convolution (432) can be interleaved with other block types that include a convolution along the input channel dimension. This interleaved pattern can mitigate the lack of cross-group input channel convolutions.

In general, the respective architecture of process blocks 410, 430 replaces the K×K depthwise convolution with a K×K group convolution. At least one advantage of replacing the K×K depthwise convolution with a K×K group convolution is that the K×K group convolution yields more trainable parameters with reduced latency relative to a full convolution. The additional trainable parameters from use of the K×K group convolution contributes to an increase in model accuracy. This increased accuracy can be achieved with only a slight or minimal increase in latency when compared to the depthwise convolution.

The replacement of the depthwise convolution with the group convolution can be specific to convolution operations for particular types of hardware accelerators, such as tensor processing units (TPUs) that are configured for mobile device or Edge computing applications. In some implementations, relative to the K×K depthwise convolution, a K×K group convolution may be configured to achieve more efficient hardware mappings with regard to a hardware layout of integrated circuit 114. For example, rather than a 1-to-1 relationship in terms of input to output channels, a group convolution can leverage a block concept to perform convolutions along the input channel within the groups. This provides algorithmic benefits that allow for use of more information along the input channels, which improves the representation capacity at one or more layers of a computer vision network.

Channel dimensions can get larger as computations for certain machine-leaming tasks progress to deeper layers of a CNN. In an attempt to realize certain performance improvements, such as output accuracy or computing/processing speed, prior approaches explored using fused IBN layer blocks, such as the fused-IBN layer 407 described above. However, use of fused-IBN layers becomes impractical due to the cost of performing a full convolution over the larger respective dimensions of the input channels (zin), which leads to slower computing speeds.

Figure 5:
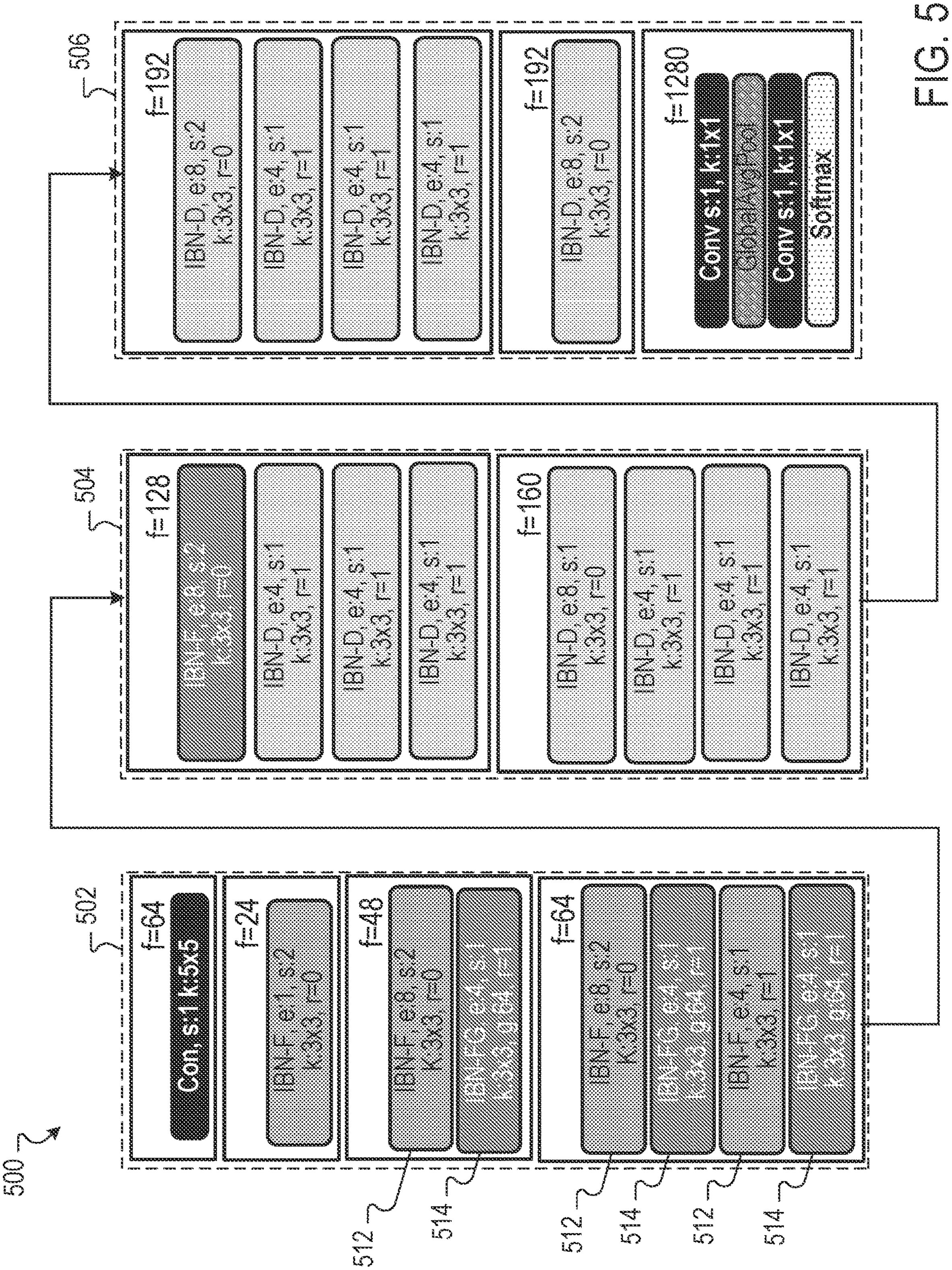
FIG. 5 is an example architecture for a convolutional neural network model that can be used in the example computing system of FIG. 1.

Relative to prior approaches, the respective group convolutions of process blocks 410, 420, and 430 provide neural block alternatives that can each improve model performance, while minimizing certain processing penalties. For example, the fused-grouped IBN block 422 can be used to achieve performance improvements, without the latency or expansive/large dataset processing penalties that are associated with conventional IBN layers or fused-IBN layers. In general, each of the group convolution blocks 414, 416, 422, 432 are neural network blocks that can include one or more group convolution layers. Moreover, each of the group convolution blocks 414, 416, 422, 432 can be interleaved with other layers or block types that implement a convolution along the input channel dimension. An example of interleaved neural blocks is illustrated at FIG. 5.

The interleaved pattern can mitigate the lack of cross-group input channel convolutions. For example, while group convolution uses cross-channel information, such information is limited to a group only, and a shuffle operation is typically required to mix information along the channel dimension when groups are used. The interleaved pattern also avoids the use of these additional shuffle operators (e.g., ShuffleNet). Much like blocks 410 and 430, the fused-group convolution operation, e.g., via block 422, can generate more trainable parameters relative to the baseline IBN and allows for increases in processing speed (e.g., runs faster) compared to the baseline IBN and fused IBN layers for certain types of tensor shapes.

In some implementations, depthwise convolutions limit the input and output channels to be the same size, however group convolutions can enable different sizes. For example, a K×K group convolution (414) kernel can perform an initial reduction in the channel size, before the 1×1 projection lowers the channel size to a final value. One assumption here is that if group convolutions reduce channels to a final channel dimension, thereby eliminating the 1×1 projection, the performance can be less than optimal (e.g., degraded) due to the small channel depth (zo) per group. But, this can be mitigated if group convolutions are natively supported via an integrated circuit configuration that allows for implementation of progressive expansion. For example, the circuit configuration can include an input bus that allows for passing inputs to distinct MACs of the integrated circuit. This is described in more detail below with reference to FIG. 6-FIG. 9.

The system 100 is operable to select from multiple different types of group convolution blocks. For example, in addition to the group convolution blocks 414, 416, 422, 432 described above, the system 100 can also select from a fused-projection-grouped convolution block that implements a K×K group convolution. The fused-projection-grouped convolution fuses pointwise projection into the K×K main convolution (instead of fusing pointwise expansion). Depending on the tensor shapes, the fused-projection grouped-IBN may provide more trainable parameters while achieving similar processing efficiency compared to fused-IBN. The fused-projection grouped-IBN keeps part of the projection layer un-fused and allows channel-wise convolution across groups after the main K×K convolution.

FIG. 5 is an example architecture 500 for a convolutional neural network of a machine-learning model 102 that can be used in the example computing system of FIG. 1. The neural architecture 500 can implement multiple respective sets of convolution operations to obtain different characterizations of an example input image. In some implementations, system 100 is operable to strategically select and place various IBN layer/block options from the grouped and non-grouped IBN options described above with reference to the example of FIG. 4. In some implementations, the system 100 is operable to select and arrange the operations in a stacked, connected, or combined configuration (i.e., arrange and combine them together) to form the example architecture 500, which may be used to implement a large scale computer vision network/model.

In the example of FIG. 5, the architecture 500 includes a sequence of layer blocks, where each of a first subset of the layer blocks in the sequence is configured to perform operations for processing an input image. More specifically, the architecture 500 includes a first subset of layer blocks 502, a second subset of layer blocks 504, and a third subset of layer blocks 506. In some implementations, at least one subset of layer blocks 502, 504, 506 can include an alternating sequence of two or more different types of neural blocks. For example, the subset of layer blocks 502 can have an alternating sequence that includes a fused-IBN layer and a fused-group IBN layer.

The fused-IBN layer can represent a first individual neural block 512, such as fused-IBN layer 407 (described above) that merges expansion and depthwise convolution operations into a single full convolution neural block, whereas the fused-group IBN layer can represent a second individual neural block 514, such as fused-group IBN 422 that allows for replacing a pointwise (404)+depthwise (405) pair and fusing aspects of those operations via the K×K group convolution (422) to expand the channel dimension. As discussed above, this block can provide an alternative to the fused-IBN layer 407 that allows for more efficient processing along the channel dimensions.

More specifically, the first neural block 512 can be a non-grouped IBN block, whereas the second neural block 514 can be a grouped IBN block. Each of the first and second neural blocks 512, 514 includes one or more convolutional neural network layers. Hence, layer blocks 502 can include an alternating sequence of grouped and non-grouped IBN layers. For example, the alternating sequence of layer blocks can have group convolution layer blocks that are interleaved with non-group convolution layer blocks.

Figure 6:
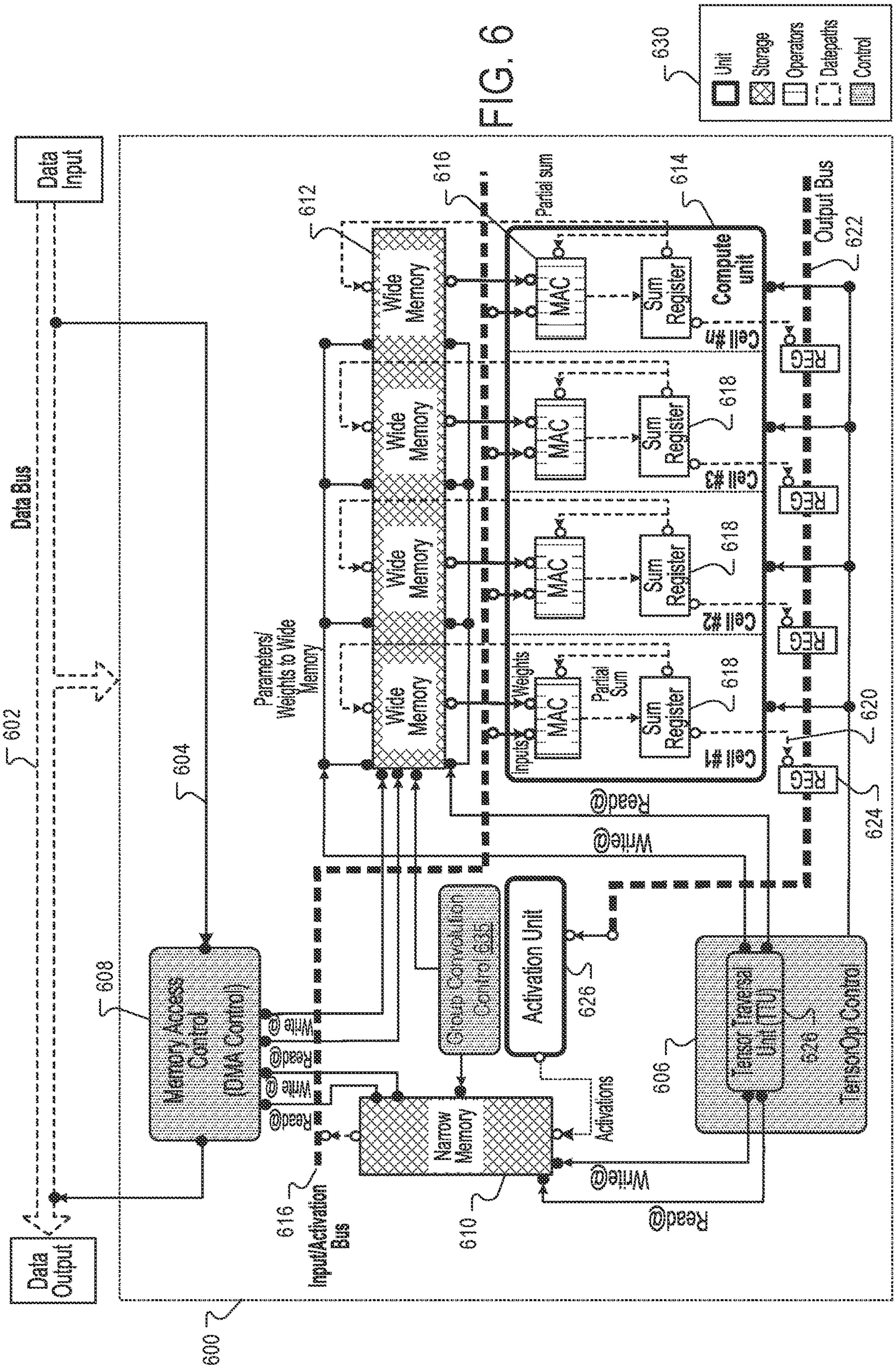
FIG. 6 illustrates an example hardware compute tile of a hardware integrated circuit used to perform computations for a convolutional neural network.

FIG. 6 illustrates an example hardware compute tile 600 ("compute tile 600") used to perform computations for a convolutional neural network. Multiple compute tiles 600 may be arranged or configured to form a special-purpose processor, such as a neural network processor, an application specific integrated circuit, or hardware accelerator. In some implementations, compute tile 600 is one of multiple compute tiles that are included at hardware integrated circuit 114, described above.

Each compute tile 600 is configured to independently execute computations (e.g., neural network computations) required by one or more layers of a multi-layer neural network. For example, compute tile 600 is configured to execute multiple compute threads based on data and instructions obtained locally from a memory (described below) of the compute tile 600. In some cases, data and instructions are received at the compute tile 600 via a communication/data bus 602 of hardware integrated circuit 114. For example, the data bus 602 can be coupled to each of the compute tiles 600 to route data and compute instructions between different compute tiles 600. Hence, for a given compute tile 600, data and instructions can be received at the compute tile 600 from a source external to the tile. The source can be another compute tile 600, a higher-level controller of the hardware circuit 114, a host device external to the hardware circuit 114, or a combination of these.

Compute tile 600 receives a set of data 604 that can include instructions and operands for executing neural network computations. As described below, the data 604 can be instructions and operands for executing a group convolution operation. The compute tile 600 uses its local control logic (e.g., a controller) to identify the instructions and operands in response to analyzing the data 604. The control logic generates control signals for processing the operands based on one or more instructions. For example, the control logic uses one or more opcodes of an instruction to generate respective control signals for a corresponding component of the compute tile 600. The components cooperate to execute the group convolution operation based on the control signals.

In the example of FIG. 6, the local control logic is represented at least by a tensor control unit 606 ("tensor control 606") and a memory access control unit 608 ("DMA control 608"). The tensor control 606 includes a tensor traversal unit (TTU) 626. In general, the tensor control 606 uses the TTU 626 to administer tensor traversal operations for neural network computations. This is described in more detail below. The DMA control 608 manages writing/storing operands for a given computation to memory locations of a local memory included at the compute tile 600. The DMA control 608 also manages reading/obtaining operands for a given computation from the memory locations of the local memory. In some implementations, the DMA control 608 performs its memory access operations in cooperation with the TTU 626. In some other implementations, the DMA control 608 includes its own dedicated TTU for performing its memory access operations independent of cooperation with the TTU 626.

Each compute tile 600 includes a memory for storing inputs to a neural network layer and for storing weights for the layer. The inputs and weights correspond to the operands (or data) that arrive at the compute tile 600 via the communication bus 602. In the example of FIG. 6, the memory includes a first memory 610 that stores inputs to a neural network layer and a second memory 612 that stores weights for the neural network layer. The first memory can be a narrow memory that stores, reads, or otherwise manages data in, for example, 8-bit chunks, whereas the second memory can be a wide memory that stores, reads, or otherwise manages data in, for example, 32-bit chunks. Each of the first and second memory can store, read, and manage data having more or fewer bits. In some implementations, each of the first and second memory 610, 612 is a sub-part of a larger local memory of compute tile 600. In some other implementations, each of the first memory 610 and second memory 612 is a distinct local memory unit of compute tile 600.

Each of the compute tiles 600 includes a respective computational unit 614 that is configured to perform arithmetic operations, such as addition and multiplication, using operands corresponding to the inputs and weight values passed to the compute tile 160. Each of the computational units 614 can include multiple arithmetic blocks. In the example of FIG. 6, the arithmetic blocks are each identified as "cell #_." Each arithmetic block (or cell) includes a multiply accumulate cell 616 and a sum register 618. The multiply accumulate cells 616 are configured to perform arithmetic operations (e.g., multiplications) using the inputs and weights.

For example, the arithmetic operations include multiplying inputs or activations obtained from narrow memory 610 with weights obtained from wide memory 612 to produce one or more sets of accumulated values. Each of the compute tiles 600 include a respective input bus 617 that allows for broadcasting, passing, or otherwise providing inputs to distinct blocks or multiply accumulate cells 616 of the computational unit 614. In some implementations, the input bus 617 is a broadcast input bus that broadcasts inputs for a group convolution layer, from narrow memory to one or more multiply accumulate cells. The sum registers 618 are used to store partial sums which can be grouped to form sets of accumulated output values 620.

Each of the compute tiles 600 includes an output bus 622 and an activation unit 626 that is coupled to the output bus 622. The compute tile 600 may optionally include one or more registers 624 that are coupled to the output bus 622. In some implementations, each of the one or more registers 624 are individual shift registers that are used to shift output values 620 (e.g., accumulated values or partial sums) for a neural network layer to the activation unit 626. The activation unit 626 is operable to apply a non-linear activation function to the output values 620. The activation unit 626 is operable to generate a set of output activations for the layer based on the activation function applied to the outputs 620.

The activation unit 626 is coupled to the first memory 610 and configured to pass output activations to the narrow memory 610 for storing in the memory. The output activations correspond to a layer output of a neural network layer. For example, a set of output activations can be an output (or portion of an output) of a group convolution layer that applies a group convolution to an input feature map to generate an output feature map. Hence, the output activations can correspond to the output feature map. In some implementations, the activation unit 626 is operable to aggregate multiple partial sums or accumulated values into a vector of values.

Each compute tile 600 can include an optional group convolution control 635 that is operable to manage and implement operations for a group convolution layer at the compute tile. For example, the compute tile 600 can receive an instruction to process a set of inputs through a group convolution layer by applying a group convolution to one or more groupings of inputs along a channel dimension of an input feature map. Individual inputs of the one or more groupings of inputs may be stored across various locations of memory 610 as well as across different compute tiles 600. Each memory location is identified by a respective address. An individual memory location (or its respective address) that stores a respective group convolution input may correspond to elements of an input tensor, such as a multi-dimensional input tensor, or input feature map stored at the first memory 610.

The group convolution control 635 can obtain or determine a memory address for a corresponding group convolution input to be broadcast to one or more multiply accumulate cells 616. In some implementations, the group convolution control 635 is in data communication with the DMA control 608 and interacts with the DMA control 608 to issue an address for accessing a memory location for a corresponding group convolution input. In some other implementations, the group convolution control 635 communicates directly with the first memory 610 to access a memory address for a corresponding group convolution input. The group convolution control 635 may perform similar operations to access weights of a parameter tensor stored at the second memory 612 and cause the weights to be passed to, or loaded at, a corresponding multiply accumulate cell. The group convolution control 635 is described more below with reference to FIG. 8.

Each compute tile 600 is configured to execute one or more compute threads. In some implementations, the hardware circuit 114 executes multiple compute threads in parallel using some (or all) of the compute tiles 600. The compute threads may be executed over multiple clock cycles and are used for processing inputs to a neural network layer to generate an output for the neural network layer. For example, a respective subset of compute threads can be allocated to one or more compute tiles 600 to execute a loop nest for a group convolution layer that applies a group convolution to an example input feature map. This is described in more detail below. FIG. 6 includes a reference map 630 that indicates a respective attribute of the different components in compute tile 600. Reference map 630 is shown for clarity, but is not included in the compute tile 600.

The attributes include whether a particular component is a unit, a storage device, an operator, a control device or a data path.

Figure 7A:
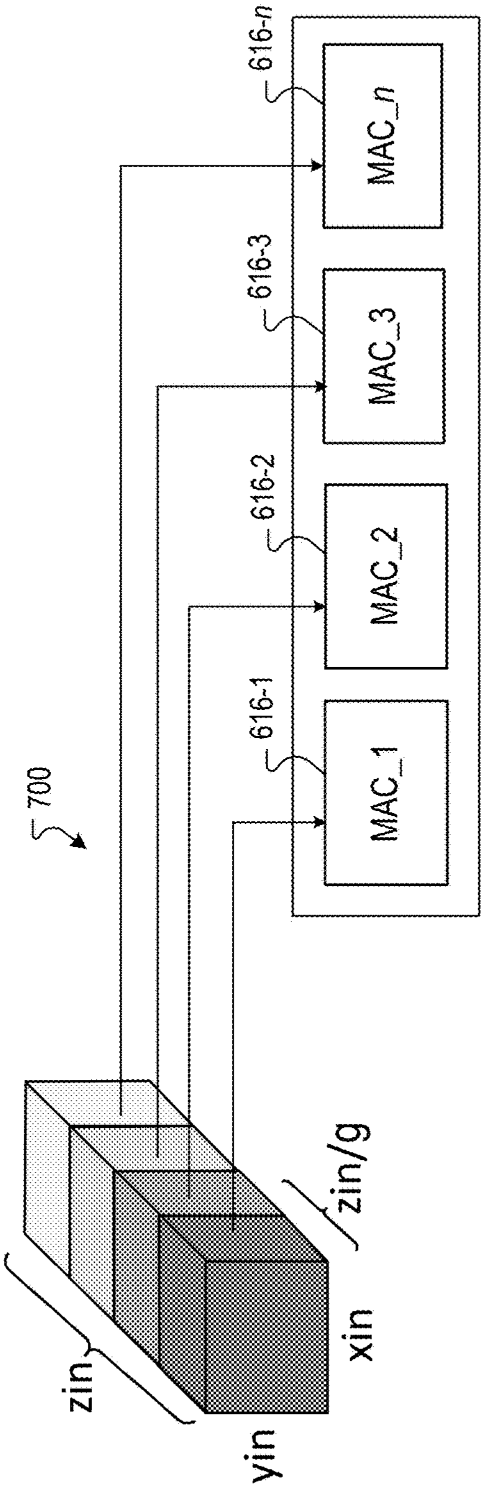
FIG. 7A is a block diagram showing an example mapping of partitions to a subset of multiply accumulate cells.
Figure 7B:
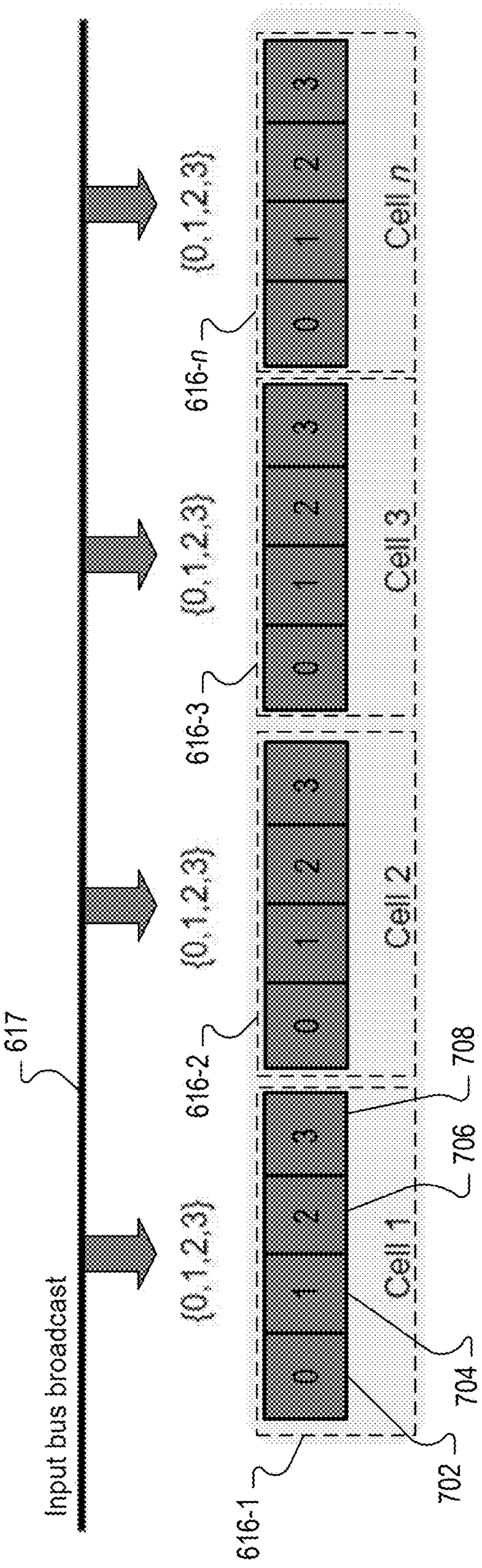
FIG. 7B is a block diagram showing an example input bus that provides respective inputs to multiply accumulate cells of a hardware compute tile.

FIG. 7A is a block diagram showing an example mapping of partitions to a subset of multiply accumulate cells 616. FIG. 7B is a block diagram showing an example input bus 617 that provides respective inputs to multiply accumulate cells 616 of a hardware compute tile 600.

Referring initially to FIG. 7A, as described above, data and instructions can be received at the compute tile 600 from a source external to the tile. The source can be another compute tile 600, a higher-level controller of the hardware circuit 114, a host device external to the hardware circuit 114, or a combination of these. Based on the type of group convolution operation being performed, the system 100 can select from different predefined values for the control parameter, g, which represents a number of group convolutions (e.g., the partitioning). For example, the system 100 can select a particular value for g for different group convolution neural blocks of a given neural network architecture. In some implementations, the value for g is predefined at an external host for a given operation and passed to the controller of the hardware circuit 114.

In some implementations, the higher-level controller identifies one or more partitions along a channel dimension (e.g., Zin) of an input feature map based on the control parameter g. The system 100 can form one or more groupings along the channel dimension based on the one or more partitions. In the example of FIG. 7, respective groupings of input channels are formed along Zin of an example input tensor or input feature map. Each respective grouping can be mapped to a corresponding multiply accumulate cell 616-1, 616-2, 616-3, 616-4, as described below. Further, each grouping of input channels includes a respective size. More specifically, each grouping includes a respective quantity of input channels that correspond to the respective size of the grouping. For example, as indicated in the illustration of FIG. 7A, a size parameter, S, of a grouping or partition can be defined by Zin/g, where Zin is the number of input channels along a channel dimension of an input tensor and g is the number of groups as defined by the control parameter described above.

The system 100 is operable to determine a mapping 700 of the groupings to the multiply accumulate cells 616 in the computational unit 614. For example, the mapping can be determined locally at a compute tile 600 or using the higher-level controller of the integrated circuit 114. In some implementations, the host device determines the mapping, generates mapping instructions, and passes the mapping instructions to the higher-level controller, which in turn passes the instructions to the compute tiles 600. For example, the integrated circuit 114 can include a host interface block for receiving data or instructions that are passed to the higher-level controller from an external host device.

In some implementations, the system 100 (e.g., the host or a controller of the integrated circuit) determines the mapping based on a number of channels in each of the partitions. For example, either the host device or the higher-level controller can access information describing a hardware configuration of the integrated circuit 114, including a configuration of the computational unit 614 in each compute tile 600. Based on these hardware configurations, the system 100 can determine a respective size of each grouping with reference to a quantity or layout of multiply accumulate cells at the computational unit 614. For example, the system 100 can determine an optimal mapping of groupings and respective inputs to multiply accumulate cells 616 to maximize overall utilization of the computational unit 614. This is described in more detail below.

Referring now to FIG. 7B, an example architecture is shown where the input bus 617 coupled to a narrow memory 610 broadcasts inputs/activations to one or more multiply accumulate cells 616. The inputs can be shifted, or sent out, one at a time unto the input bus 617 for receipt by a corresponding multiply accumulate cell 616.

In some implementations, the input bus 617 is a broadcast input bus that broadcasts group convolution layer inputs obtained from the narrow memory 610 to one or more of the multiply accumulate cells 616. For example, the input bus 617 can pass (or broadcast) a respective input to distinct multiply accumulate cells 616-1, 616-2, 616-3, **616-*n* of the integrated circuit 114. Hence, the input bus 617 includes a broadcast function that allows the integrated circuit 114 to broadcast multiple inputs for each grouping along a Zin dimension of an input feature map to a corresponding multiply accumulate cells 616** based on the determined mapping discussed above.

In some implementations, the same input is shared between some (or all) multiply accumulate cells 616 in a subset of cells 616. The width of input bus 617 must be wide enough to supply the broadcasted inputs to the corresponding number of multiply accumulate cells 616 for a given subset of the computational unit 614. For example, regarding a structure of the input bus 617, if the number of multiply accumulate cells 616 in the computational unit 614 is four and the data resolution/width of an input (or activation) is 8-bits, then the input bus 617 can be configured to provide up to four input activations every cycle. In this example, each multiply accumulate cell 616 can receive a single activation of the four activations that are broadcast.

The system 100 can broadcast, via the input bus 617, respective first inputs ("0") for a first grouping (along Zin) of an input feature map to each multiply accumulate cell 616-1, 616-2, 616-3, **616-*n*, in a subset of multiply accumulate cells 616. Likewise, the system 100 can broadcast, via the input bus 617, respective second inputs ("1") for a second grouping (along Zin) of an input feature map to each multiply accumulate cell 616-1, 616-2, 616-3, 616-*n*, in a subset of multiply accumulate cells 616. The first and second inputs that are broadcast are reused during computations for the group convolution layer. For example, each input 702 ("0"), 704 ("1"), 706 ("2"), 708** ("3"), can correspond to a different grouping along the channel dimension of an activation tensor.

In some implementations, each input 702, 704, 706, 708, may be broadcast and reused across each multiply accumulate cell to parallelize computations for a group convolution layer. For example, to perform a portion of the group convolution, an input that is reused is multiplied with different individual weight values fetched from memory locations of wide memory 612 and routed to a respective weight register of a multiply accumulate cell 616. This reuse attribute is described in more detail below with reference to FIG. 8. Parallelizing computations for each Zin grouping in this manner enables the circuit 114 to maximize utilization of its computational unit 614 as well as the corresponding multiply accumulate cells 616 in the unit. More specifically, a circuit architecture for executing group convolutions that allows at least for input broadcasting across multiply accumulate cells 616 of the circuit 114 can achieve utilization and efficiency levels that exceed those of conventional circuit architectures that are used to perform group convolutions.

Moreover, at least one benefit of group convolution based neural blocks is they allow for changing the operation intensity. For example, the operation intensity can be adjusted to control an amount of operations that are performed at a multiply accumulate cell 616 as well as the overall utilization of the cell per weight fetched. This allows system 100 to optimize for parameter bandwidth. In some cases, applications for inference-on-the-edge computations may have limited memory bandwidth. Group convolutions can be used to maximize overall compute time and minimize (or avoid) the need for extraneous memory operations to fetch new weights from memory.

Figure 8:
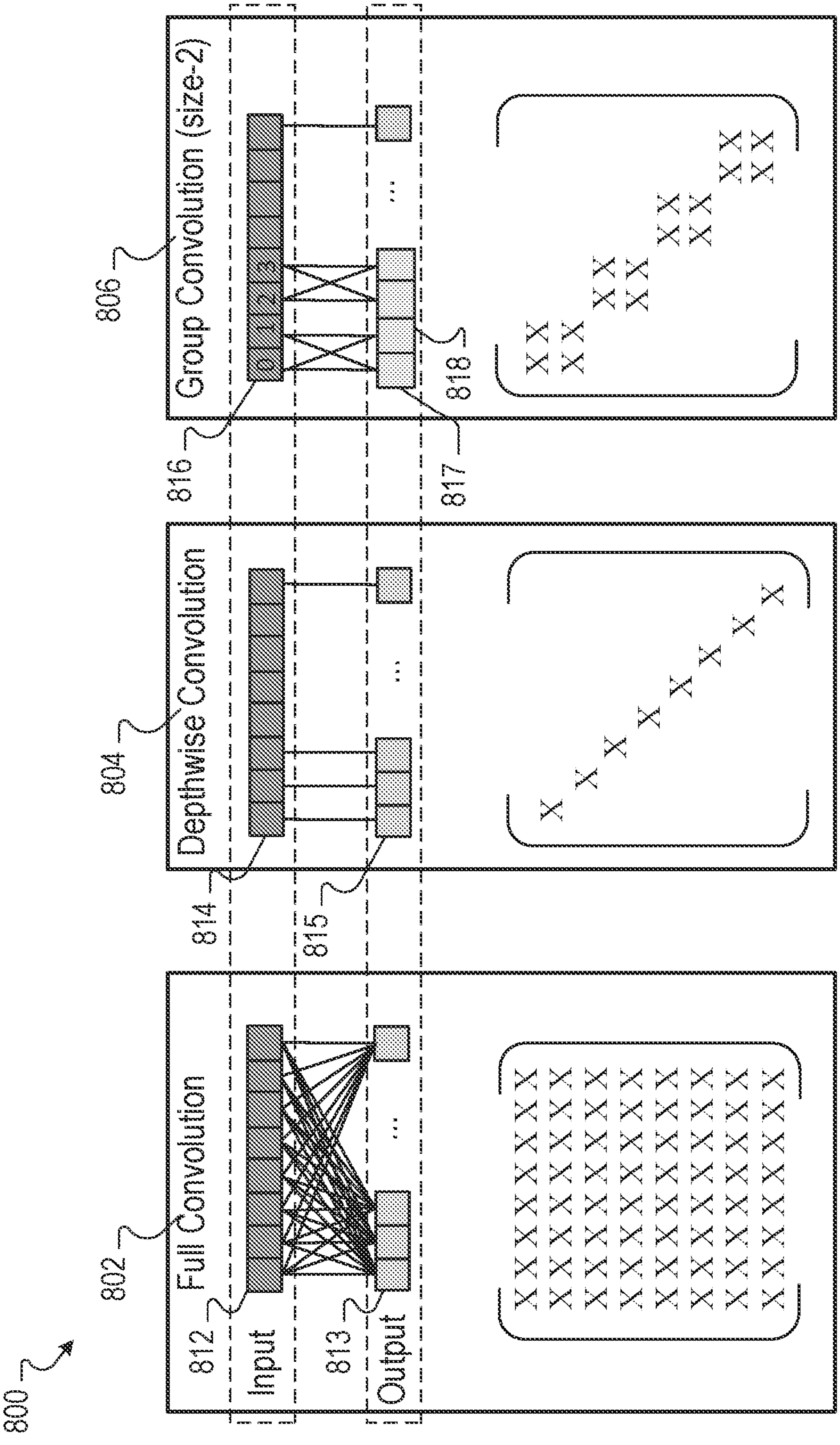
FIG. 8 is an example block diagram that indicates certain attributes of full, depthwise, and group convolutions.

FIG. 8 is an example block diagram 800 that indicates certain attributes of full, depthwise, and group convolutions. More specifically, block diagram 800 indicates respective reuse attributes of inputs processed during a full convolution operation (802), a depthwise convolution operation (804), and a group convolution operation (806). In the example of FIG. 8, reuse is shown with reference to block 802 (full convolution) and block 806 (group convolution). For example, a first block 802 indicates that each input 812 is reused to compute each output channel 813 for a full convolution, whereas a second block 804 indicates that each input 814 is used only once to compute a corresponding output channel 815 for a depthwise convolution.

A third block 806 indicates that inputs can have a measure of reuse when computing a corresponding output channel 817, 818 for a given group convolution. For example, at block 806, each input 816 has a specific reuse factor (e.g., 2) when computing the corresponding output channel 817, 818. A reuse factor of an input to a group convolution layer corresponds to the size of a grouping to be processed at that layer. In some cases, each element from an input channel is reused to compute the output channels that belong to its group. In view of this, the reuse factor will be determined based on the group size.

In some implementations, a first opcode in an instruction received at a compute tile 600 specifies a value for the control parameter, g, to indicate the partitioning and subsequent grouping of group convolution inputs of an input tensor and a second opcode in the instruction specifies a value for the size parameter to indicate a reuse factor of inputs in a grouping. Each compute tile 600 can also use its local group convolution control 635 to determine a size parameter based on a hardware configuration of the compute tile 600, a group convolution to be performed at the compute tile 600, or both.

The circuit 114 can have 32 or 64 multiply accumulate cells in compute unit 614. The group convolution control 635 can identify one or more opcodes in an instruction that specifies a group convolution operation at the compute tile 600. For example, the group convolution control 635 can determine that the group convolution is a K×K group convolution (416) to perform progressive expansion of the channel dimension. The group convolution control 635 can determine that this particular type of convolution operation is applied at one or more group convolution layers of the grouped-IBN progressive expansion neural block 416.

In some implementations, the system 100 can select a predefined value for the control parameter, g, that is specific to a particular type of convolution operation. For example, for a given group convolution neural block 412, 416, 422, or 432, the system 100 can select from a predetermined control value, g, for different group convolution operations associated with each neural block. The groupings for the group convolution operation are defined from the control value. In some implementations, the group convolution control 635 of a given compute tile 600 determines a local mapping 700 of the groupings to the multiply accumulate cells 616 at the tile. For each grouping, the group convolution control 635 can identify a group convolution layer of the neural block 416 for processing a group convolution input 816 of the operation and set a size parameter, S, in accordance with the grouping and the operation.

As mentioned above, each grouping includes a respective quantity of input channels that correspond to the respective size of the grouping, such that a size parameter, S, of a grouping can be defined by Zin/g. Each grouping represents a group convolution and is associated with a corresponding channel of an output group 220-*n*. Each grouping can include respective inputs that are derived from an input feature map. In the example of FIG. 8, each input 816 can be from a different grouping along the channel dimension of an input tensor. In some implementations, the group convolution control 635 analyzes one or more opcodes of an instruction and, based on the opcode(s), determines that the compute tile 600 is to apply a K×K group convolution (416) to perform progressive expansion of the channel dimension, which involves increasing the number of channel dimensions.

The group convolution control 635 determines a size parameter, S, for different aspects of the group convolution and can adjust a local mapping of a grouping depending on a progression of the K×K group convolution (416). In some implementations, this progressive expansion operation is expressed statically as part of the neural network. For example, to achieve a total output channel expansion of e, a K×K group convolution (416) may expand the output channels by a factor g_e. As discussed above, the expansion can be followed by a 1×1 pointwise convolution that has an expansion of e/g_e such that the total expansion is g_e*e/g_e=e.

An example operation involving computations for a group convolution will now be described.

Referring again to the example of 64 multiply accumulate cells, the group convolution control 635 can fetch 64 different weight values for the group convolution layer from wide memory 612. For example, the group convolution control 635 can fetch the 64 different weight values based on the hardware configuration (e.g., quantity of cells), the type of group convolution layer, or both. The group convolution control 635 can also fetch a corresponding input 816 from memory 610. The fetched input should have reuse across the multiply accumulate cells 616. In some implementations, the fetched input has reuse across all 64 multiply accumulate cells. In some other implementations, the fetched input has reuse across a subset of the 64 multiply accumulate cells. In general, every input within a group has a measure of reuse over the outputs in the same group.

In this example, the input 816 can be selected from of an input feature map that has an input depth of 64, such that the input depth corresponds to the number of multiply accumulate cells. The compute tile 600 can use its 64 cells to compute 1000 outputs. The group convolution control 635 can set the group size to 64, such that for every cycle of fetching and broadcasting one input value 816, the compute tile 600 can use that input 816 to compute 64 outputs of the 1000 outputs. Hence, if the group size is large enough, a given compute tile 600 can achieve 100% utilization of its input bus. This is because every cycle of fetching 1 input value leads to use by all 64 cells.

So, the compute tile 600 can define the group size based on the quantity of multiply accumulate cells and, depending on certain characteristics of the group convolution, achieve full utilization of multiply accumulate cells without incurring processing penalties of a full convolution. In an example involving a single input channel, if a group size=2 this means the compute tile 600 will convolve two channel elements (e.g., two inputs 816). Hence, the compute tile 600 will convolve that many channel elements based on the group size. For a full convolution the group size is equal to the entire input channel size.

If there are 1000 input channels, then for the full convolution the system 100 convolves the entire 1000 input channels to compute one output channel, where the output here is a channel of values or activations. For a depthwise convolution, the system 100 just computes one input channel to compute one output channel. In this example, if the group size is 1, then this is a depthwise convolution. If the group size is 2, then to calculate one output channel requires convolving 2 input channels. If the group size is 4, then to compute one output channel requires convolving 4 input channels.

Figure 9:
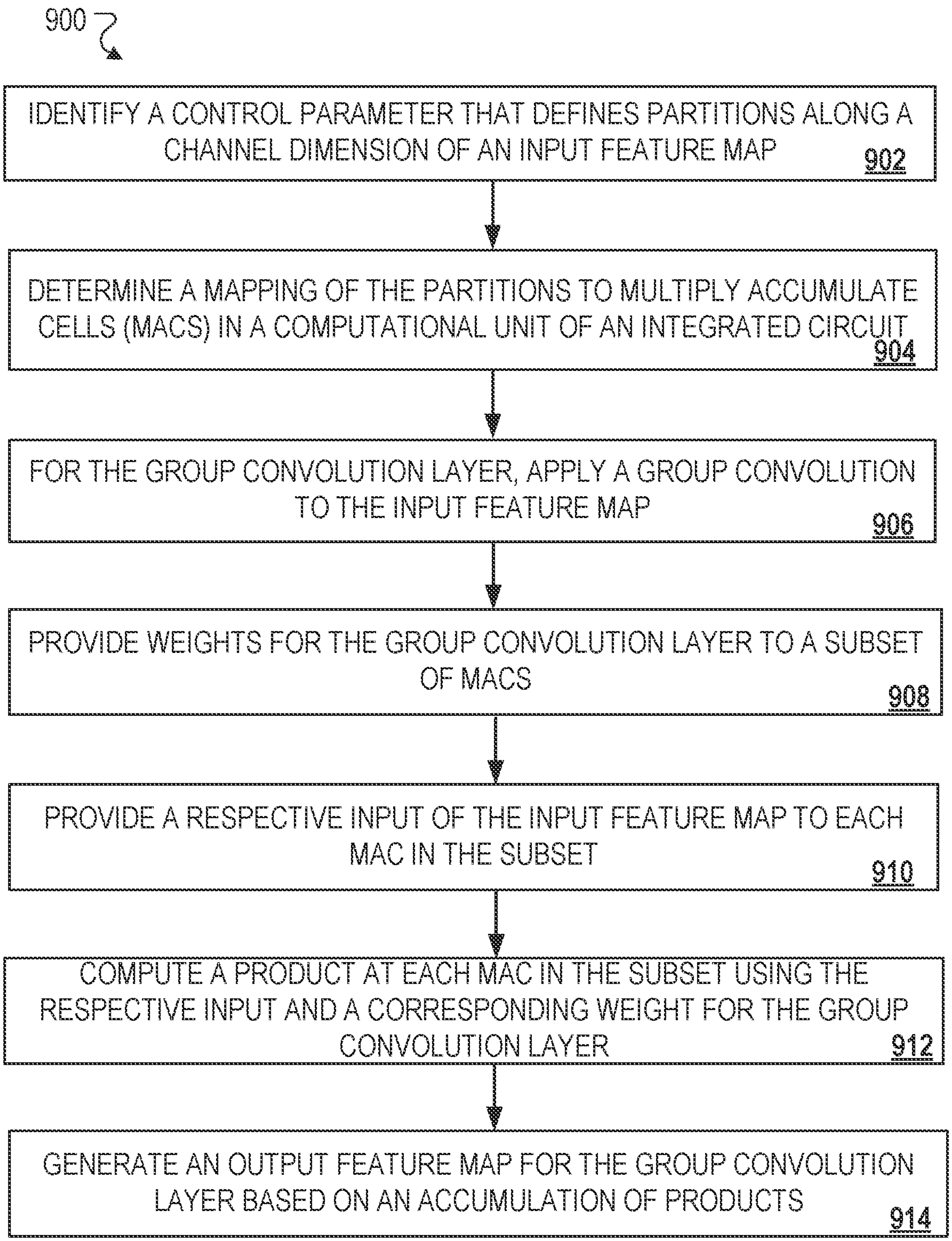
FIG. 9 is an example process for applying group convolutions using a hardware integrated circuit.

FIG. 9 is a flow diagram of an example process 900 used to process an example image by applying a group convolution using a hardware integrated circuit. The hardware integrated circuit is configured to implement a CNN that includes multiple neural network layers, where the multiple layers include a group convolution layer. The example image may be image 102 described above or various other types of digital images and related graphical data. In some implementations, process 900 is part of a technique used to accelerate neural network computations that also allows for improved accuracy of image processing outputs, relative to other data processing techniques.

Process 900 can be implemented or executed using the system 100 described above. Hence, descriptions of process 900 may reference the above-mentioned computing resources of system 100. The steps or actions of process 900 can be enabled by programmed firmware, or software instructions, that are executable by one or more processors of the devices and resources described in this document. In some implementations, the steps of process 900 correspond to a method for performing computations to generate an output for a convolutional neural network layer, e.g., a group convolution layer, using a hardware integrated circuit. The integrated circuit can be a special-purpose neural network processor or hardware machine-learning accelerator configured to implement the CNN.

Referring again to process 900, the system 100 identifies a control parameter associated with an input feature map (902). For example, a control parameter is identified that defines two or more partitions along a channel dimension of the input feature map. The system 100 determines a mapping of the two or more partitions (904). More specifically, the system 100 determines a mapping of the partitions to multiply accumulate cells in a computational unit of the hardware integrated circuit.

For the group convolution layer, the system 100 applies a group convolution to the input feature map using the hardware integrated circuit (906). For each of the two or more partitions, applying the group convolution for the group convolution layer includes: providing, weights for the group convolution layer to a subset of the multiply accumulate cells (908). For example, the system 100 provides the weights to the subset of multiply accumulate cells based on the determined mapping. The weights are provided from an example wide memory of the compute tile 600.

The system 100 provides inputs of the input feature map to the subset of multiply accumulate cells (910). For example, a respective input of the input feature map is provided to each multiply accumulate cell in the subset via an input bus of the integrated circuit. More specifically, each hardware compute tile 600 includes a respective input bus that is used to broadcast one or more inputs to a given multiply accumulate cell.

The system 100 computes a product using the respective input and a corresponding weight for the group convolution layer (912). For example, the product is computed by multiplying a respective input and corresponding weight at each multiply accumulate cell in the subset, using multiplication circuitry of the multiply accumulate cell.

The system 100 generates an output feature map for the group convolution layer (914). For example, the output feature map for the group convolution layer is generated based on an accumulation of multiple respective products that are computed at each multiply accumulate cell 616 in the subset of multiply accumulate cells. The computations process performed within a compute tile 600 for group convolution layers include a multiplication of data values (e.g., inputs or activations) stored at respective elements of an input tensor with data values (e.g., weights) stored at respective elements of a parameter tensor. For example, the computations include multiplying an input or activation value with a weight value on one or more cycles to generate multiple products (e.g., partial sums), and then performing an accumulation of those products over many cycles. In some implementations, generating the output feature map includes generating the output feature map based on a respective size of each grouping (or partition) of input channels.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term “computing system” encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for processing an input image using a hardware integrated circuit configured to implement a convolutional neural network comprising a plurality of neural network layers, the plurality of neural network layers comprising a group convolution layer, the method comprising:

identifying a control parameter that defines a plurality of partitions along a channel dimension of an input feature map based at least on determining that the convolution neural network with the defined plurality of partitions meets performance objectives;

determining a mapping of the plurality of partitions to a plurality of multiply accumulate cells (MACs) in a computational unit of the integrated circuit;

applying, for the group convolution layer, a group convolution to the input feature map, comprising, for each of the plurality of partitions:

based on the determined mapping, providing weights for the group convolution layer to a subset of the plurality of MACs;

providing, via an input bus of the integrated circuit, a respective input of the input feature map to each MAC in the subset; and computing, at each MAC in the subset, a product using the respective input and a corresponding weight for the group convolution layer; and generating an output feature map for the group convolution layer based on an accumulation of products.

2. The method of claim 1, wherein determining a mapping of the plurality of partitions to the plurality of multiply accumulate cells comprises:

determining the mapping based on a number of channels in each of the plurality of partitions.

3. The method of claim 2, wherein:

each partition of the plurality of partitions comprises a respective quantity of input channels that correspond to a respective size of the partition.

4. The method of claim 3, wherein generating the output feature map comprises:

generating the output feature map based on the respective size of each partition.

5. The method of claim 3, further comprising:

accessing information describing a hardware configuration of the computational unit; and determining the respective size of each partition based on the hardware configuration of the computational unit.

6. The method of claim 1, wherein the input bus includes a broadcast function and the method further comprises:

broadcasting, via the input bus and for each partition, multiple inputs of the input feature map to the computational unit of the integrated circuit.

7. The method of claim 6, further comprising:

broadcasting, via the input bus and for a first partition of the input feature map, first inputs of the first partition to each MAC in the subset;

wherein the first inputs that are broadcast are reused during computations for the group convolution layer.

8. The method of claim 7, wherein:

the first partition of the input feature map corresponds to a first partition of the output feature map; and the first inputs have reuse over outputs of the first partition of the output feature map.

9. The method of claim 1, wherein generating the output feature map comprises:

computing a plurality of products using the subset of the plurality of MACs; and generating the accumulation of products from the plurality of products.

10. A system for processing an input image, the system comprising:

a processor;

a hardware integrated circuit configured to implement a convolutional neural network comprising a plurality of neural network layers that include a group convolution layer; and a non-transitory machine-readable storage device storing instructions that are executable by the processor to cause performance of operations comprising:

identifying a control parameter that defines a plurality of partitions along a channel dimension of an input feature map based at least on determining that the convolution neural network with the defined plurality of partitions meets performance objectives;

determining a mapping of the plurality of partitions to a plurality of multiply accumulate cells (MACs) in a computational unit of the integrated circuit;

applying, for the group convolution layer, a group convolution to the input feature map, comprising, for each of the plurality of partitions:

based on the determined mapping, providing weights for the group convolution layer to a subset of the plurality of MACs;

providing, via an input bus of the integrated circuit, a respective input of the input feature map to each MAC in the subset; and computing, at each MAC in the subset, a product using the respective input and a corresponding weight for the group convolution layer; and generating an output feature map for the group convolution layer based on an accumulation of products.

11. The system of claim 10, wherein determining a mapping of the plurality of partitions to the plurality of multiply accumulate cells comprises:

determining the mapping based on a number of channels in each of the plurality of partitions.

12. The system of claim 11, wherein:

each partition of the plurality of partitions comprises a respective quantity of input channels that correspond to a respective size of the partition.

13. The system of claim 12, wherein generating the output feature map comprises:

generating the output feature map based on the respective size of each partition.

14. The system of claim 12, wherein the operations further comprise:

accessing information describing a hardware configuration of the computational unit; and determining the respective size of each partition based on the hardware configuration of the computational unit.

15. The system of claim 10, wherein the input bus includes a broadcast function and the operations further comprise:

broadcasting, via the input bus and for each partition, multiple inputs of the input feature map to the computational unit of the integrated circuit.

16. The system of claim 15, wherein the operations further comprise:

broadcasting, via the input bus and for a first partition of the input feature map, first inputs of the first partition to each MAC in the subset;

wherein the first inputs that are broadcast are reused during computations for the group convolution layer.

17. The system of claim 16, wherein:

the first partition of the input feature map corresponds to a first partition of the output feature map; and the first inputs have reuse over outputs of the first partition of the output feature map.

18. The system of claim 15, wherein generating the output feature map comprises:

computing a plurality of products using the subset of the plurality of MACs; and generating the accumulation of products from the plurality of products.

19. A non-transitory machine-readable storage device storing instructions for processing an input image using a hardware integrated circuit configured to implement a convolutional neural network comprising a plurality of neural network layers that include a group convolution layer, the instructions being executable by a processor to cause performance of operations comprising:

identifying a control parameter that defines a plurality of partitions along a channel dimension of an input feature map based at least on determining that the convolution neural network with the defined plurality of partitions meets performance objectives;

determining a mapping of the plurality of partitions to a plurality of multiply accumulate cells (MACs) in a computational unit of the integrated circuit;

applying, for the group convolution layer, a group convolution to the input feature map, comprising, for each of the plurality of partitions:

based on the determined mapping, providing weights for the group convolution layer to a subset of the plurality of MACs;

providing, via an input bus of the integrated circuit, a respective input of the input feature map to each MAC in the subset; and computing, at each MAC in the subset, a product using the respective input and a corresponding weight for the group convolution layer; and generating an output feature map for the group convolution layer based on an accumulation of products.

20. The non-transitory machine-readable storage device of claim 19, wherein:

each partition of the plurality of partitions comprises a respective quantity of input channels that correspond to a respective size of the partition.

* * * * *